(12) United States Patent
Duan et al.

(10) Patent No.: US 12,496,848 B2
(45) Date of Patent: Dec. 16, 2025

(54) THIN FILM, METHOD OF PRODUCING THE THIN FILM, AND PRODUCT COMPRISING THE THIN FILM

(71) Applicant: NANYANG TECHNOLOGICAL UNIVERSITY, Singapore (SG)

(72) Inventors: Hongwei Duan, Singapore (SG); Ling Bai, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 629 days.

(21) Appl. No.: 17/996,464

(22) PCT Filed: May 6, 2021

(86) PCT No.: PCT/SG2021/050253
§ 371 (c)(1),
(2) Date: Oct. 18, 2022

(87) PCT Pub. No.: WO2021/225526
PCT Pub. Date: Nov. 11, 2021

(65) Prior Publication Data
US 2023/0191825 A1 Jun. 22, 2023

(30) Foreign Application Priority Data

May 6, 2020 (SG) .......................... 10202004162Y

(51) Int. Cl.
*B42D 25/382* (2014.01)
*B41M 3/14* (2006.01)
(Continued)

(52) U.S. Cl.
CPC ............. *B42D 25/382* (2014.10); *B41M 3/14* (2013.01); *B42D 25/44* (2014.10); *G02B 5/0242* (2013.01)

(58) Field of Classification Search
None
See application file for complete search history.

(56) References Cited

U.S. PATENT DOCUMENTS

| | | |
|---|---|---|
| 2017/0090084 A1 | 3/2017 | Wilson et al. |
| 2019/0240878 A1 | 8/2019 | Fang et al. |
| 2019/0366733 A1 | 12/2019 | Duan et al. |

OTHER PUBLICATIONS

Bai et al., "Bio-inspired vapor-responsive colloidal photonic crystal patterns by inkjet printing," *ACS Nano* 8(11):11094-11100, 2014, 7 pages.

(Continued)

*Primary Examiner* — Richard H Kim
(74) *Attorney, Agent, or Firm* — Seed Intellectual Property Law Group LLP

(57) ABSTRACT

An aspect of the disclosure relates to a thin film including an amorphous array of particles including a top surface and a bottom surface opposing each other, the thin film exhibiting thin film interference and further coherent scattering from the amorphous array of particles, wherein the thin film may include first regions and second regions, wherein the thin film interference of the second regions may be suppressed as compared to the first regions. Another aspect of the disclosure relates to a product including an indicium including a thin film in accordance with any of the previous claims, wherein the indicium may include an encoded pattern encoded by the relative position of the second regions to the first regions, wherein the encoded pattern may be visible under specular reflection of light of a pre-determined wavelength. Another aspect of the disclosure relates to a method of producing a thin film.

20 Claims, 17 Drawing Sheets

(51) Int. Cl.
B42D 25/44 (2014.01)
G02B 5/02 (2006.01)

(56) References Cited

OTHER PUBLICATIONS

Bai et al., "Hierarchical Disordered Colloidal Thin Films with Duplex Optical Elements for Advanced Anti-Counterfeiting Coding," Adv. Optical Mater. 8(24), 2001378, Oct. 28, 2020, 7 pages.
Bai et al., "Large-Scale Noniridescent Structural Color Printing Enabled by Infiltration—Driven Nonequilibrium Colloidal Assembly," Adv. Mater. 30(9), 1705667, 2018, 7 pages.
Bai et al., "Responsive Amorphous Photonic Structures of Spherical/Polyhedral Colloidal Metal-Organic Frameworks," Adv. Opt. Mater. 7(13):1900522, 2019, 8 pages.
Barthelat et al., "Structure and mechanics of interfaces in biological materials," Nat. Rev. Mater. 1(4):1-16, 2016, 16 pages.
Chung et al., "Flexible, Angle-Independent, Structural Color Reflectors Inspired by Morpho Butterfly Wings," Adv. Mater. 24(18):2375-2379, 2012, 5 pages.
Crne et al., "Biomimicry of optical microstructures of Papilio palinurus," EPL (Europhysics Letters) 93(1): 14001, 2011, 5 pages.
Dumanli et al., "Recent advances in the biomimicry of structural colours," Chem. Soc. Rev. 45(24): 6698-6724, 2016, 28 pages.
England et al., "Bioinspired micrograting arrays mimicking the reverse color diffraction elements evolved by the butterfly Pierella luna," PNAS 111(44):15630-15634, 2014, 5 pages.
Forster et al., "Biomimetic isotropic nanostructures for structural coloration," Adv. Mater. 22(26-27):2939-2944, 2010, 6 pages.
Gan et al., "Biomimetic gyroid nanostructures exceeding their natural origins," Sci. Adv. 2(5): e1600084, 2016, 7 pages.
Gao et al., "The dry-style antifogging properties of mosquito compound eyes and artificial analogues prepared by soft lithography," Adv. Mater. 19(17):2213-2217, 2007, 5 pages.
Gholipour et al., "Organometallic perovskite metasurfaces," Adv. Mater. 29(9), 1604268, 2017, 6 pages.
Hsiung et al., "Tarantula-Inspired Noniridescent Photonics with Long-Range Order," Adv. Opt. Mater. 5, 1600599, 2017, 6 pages.
Hu et al., "Magnetically responsive photonic watermarks on banknotes," JMCC 2(19):3695-3702, 2014, 8 pages.
Ito et al., "Structural colour using organized microfibrillation in glassy polymer films," Nature 570(7761): 363-367, 2019, 13 pages.
Iwata et al., "Bio-Inspired Bright Structurally Colored Colloidal Amorphous Array Enhanced by Controlling Thickness and Black Background," Adv. Mater. 29, 1605050, 2017, 8 pages.
Kolle et al., "Bio-inspired Band-gap tunable elastic optical multilayer fibers," Adv. Mater. 25(15):2239-2245, 2013, 7 pages.
Kolle et al., "Mimicking the colourful wing scale structure of the Papilio blumei butterfly," Nat. Nanotechnol. 5(7):511-515, 2010, 5 pages.
Kragt et al., "3D Helix Engineering in Chiral Photonic Materials," Adv. Mater. 31:1903120, 2019, 7 pages.
Lee et al., "Colorimetric Recording of Thermal Conditions on Polymeric Inverse Opals," Adv. Mater. 31:1901398, 2019, 7 pages.
Li et al., "Bio-inspired sensors based on photonic structures of Morpho butterfly wings: a review," JMCC 4(9):1752-1763, 2016, 12 pages.
Liao et al., "Multiresponsive Elastic Colloidal Crystals for Reversible Structural Color Patterns," Adv. Funct. Mater. 29:1902954, 2019, 10 pages.
Liu et al., "Bioinspired Noniridescent Structural Color with Hidden Patterns for Anticounterfeiting" ACS Appl. Nano Mater. 2(9):5752-5760, Aug. 27, 2019, 21 pages.
Liu et al., "Bright Silver Brilliancy from Irregular Microstructures in Butterfly Curetis acuta Moore," Adv. Opt. Mater. 7:1900687, 2019, 8 pages.
Liu et al., "Facile fabrication of microgrooves based photonic crystals towards anisotropic angle-independent structural colors and polarized multiple reflections," Sci. Bull. 62(13):938-942, 2017, 5 pages.
Liu et al., "Nature-inspired superwettability systems," Nat. Rev. Mater. 2(7):17036, 2017, 17 pages.
McCoy et al., "Structural absorption by barbule microstructures of super black bird of paradise feathers," Nat. Commun. 9(1):1-8, 2018, 8 pages.
Meng et al., "Patterned and iridescent plastics with 3D inverse opal structure for anticounterfeiting of the banknotes," Adv. Opt. Mater. 6(8):1701351, 2018, 7 pages.
Meyers et al., "Structural biological materials: critical mechanics-materials connections," Science 339(6121):773-779, 2013, 8 pages.
Mohri et al., "Morpho-Butterfly-Inspired Patterning of Helical Photonic Structures for Circular-Polarization-Sensitive, Wide-Angle Diffuse Reflection," Adv. Opt. Mater. 5, 1601071, 2017, 6 pages.
Narasimhan et al., "Multifunctional biophotonic nanostructures inspired by the longtail glasswing butterfly for medical devices," Nat. Nanotechnol. 13:512-519, 2018, 12 pages.
Nguyen et al., "Biomimetic Chiral Nematic Mesoporous Materials from Crab Cuticles," Adv. Opt. Mater. 2:1031-1037, 2014, 7 pages.
Noh et al., "How Noniridescent Colors are Generated by Quasi-ordered Structures of Bird Feathers," Adv. Mater. 22(26-27):2871-2880, 2010, 10 pages.
Pris et al., "Towards high-speed imaging of infrared photons with bioinspired nanoarchitectures," Nat. Photonics 6(3):195-200, 2012, 7 pages.
Prum et al., "Coherent light scattering by blue feather barbs," Nature 396(6706):28-29, 1998, 2 pages.
Quintero-Torres et al., "Strong far-field coherent scattering of ultraviolet radiation by holococcolithophores," Phys. Rev. E 74(3):032901, 2006, 4 pages.
Rodríguez et al., "Biotemplated morpho butterfly wings for tunable structurally colored photocatalysts," ACS Appl. Mater. Inter. 10(5):4614-4621, 2018, 8 pages.
Saranathan et al., "Structure and optical function of amorphous photonic nanostructures from avian feather barbs: a comparative small angle X-ray scattering (SAXS) analysis of 230 bird species," J.R. Soc. Interface 9(75):2563-2580, 2012, 18 pages.
Schaffner et al., "Combining Bottom-Up Self-Assembly with Top-Down Microfabrication to Create Hierarchical Inverse Opals with High Structural Order," Small 11(34):4334-4340, 2015, 7 pages.
Shi et al., "Keeping cool: Enhanced optical reflection and radiative heat dissipation in Saharan silver ants," Science 349(6245):298-301, 2015, 5 pages.
Siddique et al., "The role of random nanostructures for the omni-directional anti-reflection properties of the glasswing butterfly," Nat. Commun. 6: 6909, 2015, 8 pages.
Song et al., "Digital cameras with designs inspired by the arthropod eye," Nature 497(7447):95-99, 2013, 5 pages.
Spinner et al., "Snake velvet black: hierarchicalmicro-and nanostructure enhances dark colouration in Bitis rhinoceros," Sci. Rep. 3:1846, 2013, 8 pages.
Sun et al., "Structural coloration in nature," Rsc Adv. 3(35): 14862-14889, 2013, 28 pages.
Sweeney et al., "Insect communication: polarized light as a butterfly mating signal," Nature 423(6935):31-32, 2003, 2 pages.
Takeoka, "Angle-independent structural coloured amorphous arrays," JMC 22(44):23299-23309, 2012, 12 pages.
Vogel et al., "Color from hierarchy: Diverse optical properties of micron-sized spherical colloidal assemblies," PNAS 112(35):10845-10850, 2015, 6 pages.
Vukusic et al., "Structural colour: Colour mixing in wing scales of a butterfly," Nature 404(6777):457 2000, 1 page.
Wang et al., "Biomaterial-Based "Structured Opals" with Programmable Combination of Diffractive Optical Elements and Photonic Bandgap Effects," Adv. Mater. 31(5), 1805312, 2019, 8 pages.
Wang et al., "Light Management with Patterned Micro- and Nanostructure Arrays for Photocatalysis, Photovoltaics, and Optoelectronic and Optical Devices," Adv. Funct. Mater., 1807275, 2019, 29 pages.
Wegst et al., "Bioinspired structural materials," Nat. Mater. 14(1): 23-36, 2015, 14 pages.

(56) References Cited

OTHER PUBLICATIONS

Whitney et al., "Floral iridescence, produced by diffractive optics, acts as a cue for animal pollinators," *Science* 323(5910):130-133, 2009, 5 pages.
Wilts et al., "A literal elytral rainbow: tunable structural colors using single diamond biophotonic crystals in pachyrrhynchus congestus weevils," *Small* 14(46):1802328, 2018, 7 pages.
Wilts et al., "Natural helicoidal structures: morphology, self-assembly and optical properties," *Materials Today: Proceedings* 1:177-185, 2014, 9 pages.
Wu et al., "Optical functional materials inspired by biology," *Adv. Opt. Mater.* 4(2):195-224, 2016.
Xiong et al., "Integration of Optical Surface Structures with Chiral Nanocellulose for Enhanced Chiroptical Properties," *Adv. Mater.* 32, 1905600, 2020, 7 pages.
Yang et al., "Ultra-antireflective synthetic brochosomes," *Nat. Commun.* 8(1):1285, 2017, 8 pages.
Yoshioka et al., "Production of colourful pigments consisting of amorphous arrays of silica particles," *ChemPhysChem* 15 (11):2209-2215, 2014, 7 pages.
Yu et al., "Butterfly-inspired microconcavity array film for color conversion efficiency improvement of quantum-dot-based light emitting diodes," *Opt. Lett.* 42(23):4962-4965, 2017, 4 pages.
Yue et al., "Mechano-actuated ultrafast full-colour switching in layered photonic hydrogels," *Nat. Commun.* 5:4659, 2014, 8 pages.
Zhan et al., "A Butterfly-inspired Hierarchical Light-trapping Structure towards High Performance Polarization-sensitive Perovskite Photodetector," *Angew. Chem.* 131:16608-16614, 2019, 7 pages.
Zhang et al., "Bio-inspired angle-independent structural color films with anisotropic colloidal crystal array domains," *Nano Res.* 12 (7):1579-1584, 2019, 6 pages.
Zhang et al., "Nano/micro-manufacturing of bioinspired materials: A review of methods to mimic natural structures," *Adv. Mater.* 28(30):6292-6321, 2016, 30 pages.
Zhang et al., "Polarization sensitive color in butterfly scales: polarization conversion from ridges with reflecting elements," *Opt. Expre.* 22(22):27437-27450, 2014, 14 pages.
Zhang et al., "Using Cuttlefish Ink as an Additive to Produce Non-iridescent Structural Colors of High Color Visibility," *Adv. Mater.* 27(32):4719-4724, 2015, 6 pages.
Zhang et al., "Highly Brilliant Noniridescent Structural Colors Enabled by Graphene Nanosheets Containing Graphene Quantum Dots," *Adv. Funct. Mater.* 28, 1802585, 2018, 8 pages.
Zhao et al., "Bioinspired Heterogeneous Structural Color Stripes from Capillaries," *Adv. Mater.* 29(46):1704569, 2017, 8 pages.
Zhao et al., "Bioinspired materials: from low to high dimensional structure," *Adv. Mater.* 26(41):6994-7017, 2014, 24 pages.
Zhong et al., "Instantaneous, simple, and reversible revealing of invisible patterns encrypted in robust hollow sphere colloidal photonic crystals," *Adv. Mater.* 30(25):1707246, 2018, 8 pages.
Zhou et al., "Bio-Inspired Photonic Materials: Prototypes and Structural Effect Designs for Applications in Solar Energy Manipulation," *Adv. Funct. Mater.* 28(24): 1705309, 2018, 27 pages.

US 12,496,848 B2

THIN FILM, METHOD OF PRODUCING THE THIN FILM, AND PRODUCT COMPRISING THE THIN FILM

CROSS-REFERENCE TO RELATED APPLICATION

This patent application claims the benefit of priority of Singapore Patent Application No. 10202004162Y, filed 6 May 2020, the contents of it being hereby incorporated by reference in its entirety for all purposes.

TECHNICAL FIELD

An aspect of the disclosure relates to a thin film. Another aspect of the disclosure relates to a product comprising the thin film. Another aspect of the disclosure relates to a method of producing the thin film.

BACKGROUND

Multiscale structures are found in nature to impart brilliant structural colors with integrated properties of multiple optical elements. Natural structural colors arise from fundamental physical processes. Evolution over millions of years has led to natural selection of complicated hierarchical micro/nanostructures, which enable complicated physical processes to provide structural coloration or functions most adapted to the environment. For example, iridescence, non-iridescence, mixed or dynamic colors, chirality, polarization, ultra-blackness or other optical effects are derived from these multi-scale nanomaterials, and are important for camouflaging, mating, warning, signaling, or thermo-regulation of creatures. Inspired by these fascinating photonic structures, great efforts have been devoted to mimicking the micro-/nano-architectures to realize corresponding optical properties or functions, which have spurred the development of next-generation photonic sensors, displays, and photovoltaics. In particular, optical elements have been developed providing delicate optical features derived from collective optical functions, which could be precisely engineered by variations of the physical parameters at the nanoscale, and therefore, are of great potential for highly secure anti-counterfeiting. However, the manufacturing of such optical elements remains challenging. Therefore, there remains a need to provide for optical elements of simpler manufacturing processes.

SUMMARY

An aspect of the disclosure relates to a thin film including an amorphous array of particles, the thin film further including a top surface and a bottom surface opposing each other, the thin film exhibiting thin film interference (TFI) and further coherent scattering from the amorphous array of particles, wherein the thin film may include first regions and second regions, wherein the thin film interference of the second regions may be suppressed as compared to the first regions.

An aspect of the disclosure relates to a thin film including an amorphous array of particles, the thin film further including a top surface and a bottom surface opposing each other, wherein the thin film includes first regions and second regions, and wherein a roughness of the second regions is higher than a roughness of the first regions. The amorphous array of particles may be an amorphous colloidal array (ACA). The first regions may be optically flat.

An aspect of the disclosure relates to a product including an indicium including a thin film in accordance with various embodiments, wherein the indicium may include an encoded pattern encoded by the relative position of the second regions to the first regions, wherein the encoded pattern may be visible under specular reflection of light of a pre-determined wavelength.

An aspect of the disclosure relates to a method of producing a thin film. The method may include providing an ink composition including ink particles and a liquid. The method may include providing a substrate configured to absorb the liquid. The method may include forming an optical thin film. Forming the optical thin film may include depositing the ink composition on a surface of the substrate, wherein the liquid may be separated from the ink particles by being drawn into the substrate, while the ink particles may be retained on the surface of the substrate. The method may include modifying a top surface of the optical thin film, which is a surface facing away from the substrate, to at least partially suppress thin film interference, for example, by increasing a rugosity.

An aspect of the disclosure relates to a use of the thin film in accordance with various embodiments in anti-counterfeiting applications.

BRIEF DESCRIPTION OF THE DRAWINGS

The invention will be better understood with reference to the detailed description when considered in conjunction with the non-limiting examples and the accompanying drawings, in which.

DETAILED DESCRIPTION

Figure 1:
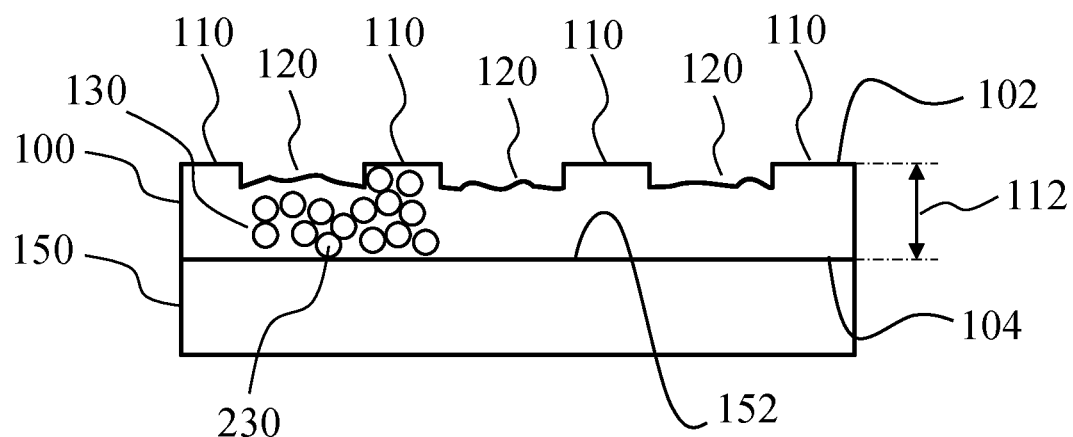
FIG. 1 shows an exemplary thin film 100 on a substrate 150 in accordance with various embodiments.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the thin films, products, or methods are analogously valid for the other thin films, products, or methods. Similarly, embodiments described in the context of a thin film are analogously valid for a product or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

Various embodiments relate to a thin film including an amorphous array of particles, the thin film further including a top surface and a bottom surface opposing each other, the thin film exhibiting thin film interference (TFI) and further coherent scattering from the amorphous array of particles (ACA properties), wherein the thin film may include first regions and second regions, wherein the thin film interference of the second regions may be suppressed as compared to the first regions. Thus, TFI and ACA properties may be presented differently in different regions, e.g., at different ratios. According to various embodiments, a roughness of the second regions is higher than a roughness of the first regions. For example, the first regions may be optically flat thereby exhibiting thin film interference, and the second regions may be non-optically flat, thereby suppressing thin film interference. In one example the amorphous array of particles may be an amorphous colloidal array (ACA). The amorphous array exhibits light backscattering. The particles may be dielectric particles, for example polystyrene particles. The thin film in accordance with various embodiments is also termed as hierarchical disordered photonic superstructures (HDPSs).

As used herein and in accordance with various embodiments, the second regions may comprise one or more second regions, each of which may be separated from the other of the one or more second regions by the first regions. For example, some, or each, of the one or more second regions may be surrounded by first regions and not connected to other second regions. In some examples, the second regions may form a larger pattern (e.g., a heart shape or a leaf shape) wherein all the second regions are connected to each other, and the larger pattern is surrounded by the first regions.

FIG. 1 shows an exemplary thin film 100 on a substrate 150 in accordance with various embodiments. The thin film 100 is deposited on a top surface 152 of the substrate 150. The thin film 100 includes a bottom surface 104 and a top surface 102 opposing each other. The thin film includes particles 230 forming an amorphous array 130. The top surface 102 of the thin film 100 includes first regions 110 and second regions 120. The second regions 120 may have a modified surface, for example an increased top surface roughness as compared to a top surface roughness of the first regions 110, e.g., by removing material (e.g., particles) from the top layer of the thin film. The first regions 110 may have a thickness 112.

As used herein, and in accordance with various embodiments, the amorphous array of particles may mean an arrangement where the (ink) particles are assembled into a state that exhibits no readily perceptible organization, regularity, or orientation of its constituent elements. Consequently, colours resulting from the amorphous arrangement of the structures are observably the same to a human naked eye when a surface with the deposited particles is viewed from different angles (i.e., angle-independent colours).

As used herein, and in accordance with various embodiments, thin film interference, refers to the optical effect produced under illumination of light, e.g., with wavelength (as measured in vacuum) in a range of wavelengths (further referred herein as "the range of wavelengths") selected from 100 nm to 10 micrometers, such as from 280 nm to 1.5 micrometers, or from 380 nm to 700 nm. For example, thin film interference may be determined by reflection peaks of constructive interference within the range of wavelengths, or a sub-range thereof. The reflection peak positions of constructive interference of the thin film can be expressed, at a normal incidence (i.e., zero angle), by:

$$m\lambda = 2n_{ACA}d \qquad \text{Eq. (1)}$$

where $\lambda$ is the wavelength of the light, m is an integer, $n_{ACA}$ is the refractive index of the thin films, and d is the thickness of the film.

As used herein, and in accordance with various embodiments, "non-optically flat" as used for the second regions may mean that in each of the second regions, the top layer is filled with randomly spaced particles, and the fill factor is smaller than 50%. For example, the top layer may be the top most monolayer, or may include the top most monolayer and layers beneath, such as 1, 2, 3, 4, or 5 layers beneath the top most monolayer.

According to various embodiments, particles of the amorphous array may have a size smaller than the thickness of the thin film, for example, the size may be equal to or less than ¼ of the thickness. As used herein, and in accordance with various embodiments, the thickness of the thin film may be the thickness as measured in the first regions or the thickness as measured for an optical thin film before it is modified into first regions and second regions, unless explicitly mentioned otherwise. The thickness of the thin film may be constant, for example, all first regions may have a same thickness, in other words, the optical thin film may be a film with uniform thickness. Alternatively, in some embodiments, the thickness of the optical thin film may vary according to the measured position, for example the thickness may vary continuously. According to various embodiments, a thickness within a region of the first regions may have a variation of less than 10 nm over a measurement path of the optical thin film of 10 micrometer. Alternatively, the thickness of the optical thin film may be measured at two positions spaced apart by 10 micrometers, and the variation of the thickness between the two positions may be less than 10 nm.

According to embodiments in which the optical thin film has a constant thickness, a thickness of the first regions may be thicker than a thickness of the second regions, in the thin film, i.e., after modifying a top surface of the optical thin film.

According to embodiments in which the optical thin film has a thickness that varies according to the measured position, thicknesses at locations of the second regions of the thin film may be smaller than thicknesses for corresponding locations on the optical thin film, i.e., before its top surface has been modified. Therefore, in the thin film, thicknesses of selected regions of the second regions may be greater than thicknesses of selected regions of the first regions.

According to various embodiments, the thickness of the thin film at the first regions may be in the range of 1 μm to 3 μm.

According to various embodiments, an optical length may be determined by $2n_{ACA}d$ (at a normal incidence) and may be in the range of from 1.83 μm to 8.15 μm.

According to various embodiments, a rugosity of the top surface in the second regions may be higher than a rugosity of the top surface in the first regions. According to various embodiments, a rugosity of the top surface of a region of the first regions may be greater than a rugosity of the top surface of a region of the second regions. According to various embodiments, a rugosity of the top surface of a region of the first regions may have a variation of less than 50 nm for a measurement length of 10 micrometer.

According to various embodiments, the top surface in the first regions may be substantially flat, e.g., substantially free of voids, and particles of a top layer of the amorphous array in the second regions may be randomly spaced and at least partially spaced apart from neighboring particles of the top layer of the amorphous array in the second regions. For example, in the first regions, particles may be contacting each other continuously throughout the region. On the other hand, in the second regions, particles may exist in discontinuous form, for example particles may be dispersed in the top layer, either alone (i.e., not contacting any other particle in the top layer) or in groups of particles.

According to various embodiments the first regions may be configured to scatter light by the amorphous array of particles and to exhibit thin film interference. As used herein, and in accordance with various embodiments, to exhibit thin film interference may mean that at least for the pre-determined wavelength, the thin film interference effect is measurable and/or visible by a person.

According to various embodiments, the second regions may be configured to scatter light by the amorphous array of particles and to have thin film interference suppressed (at least partially suppressed or completely suppressed) as compared to the first regions, e.g., the second regions may not exhibit thin film interference. As used herein, and in accordance with various embodiments, to not exhibit thin film interference may mean that at least for the pre-determined wavelength (for example for all wavelengths in the range of wavelengths) the thin film interference effect is not visible by a person and/or not measurable.

According to various embodiments, the thin film may be disposed on a substrate, wherein the substrate may be configured to absorb a liquid, and wherein the particles of the amorphous array may be dispersible in an ink composition including the liquid, e.g., the liquid may be configured to disperse the particles in a colloidal suspension. The liquid of the composition may therefore provide a dual function of dispersing the particles that will form the amorphous array and of being absorbed by the substrate for formation of the thin film comprising the amorphous array. This may be achievable due to the imbibition of the liquid in the substrate providing fast drying, e.g., due to the absorption of the liquid by the substrate.

Some embodiments concern a colloidal thin film, including: a) a liquid-absorbent or liquid-permeable substrate; b) a film of amorphous colloidal arrays (ACAs) deposited on the substrate. The colloidal thin film may include one or more regions in which the top layers are removed thereby forming a pattern including first regions and second regions, such that the second regions are thinner than the first regions, which do not have their top layers removed. The substrate may be a photo paper, a polymer, a metal, and/or a glass with a liquid-absorbing layer).

Figure 2:
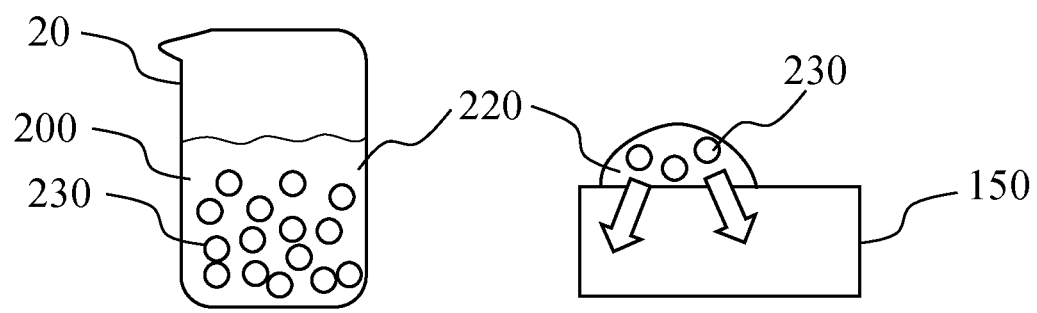
FIG. 2 illustrates the dual function of the liquid in accordance with various embodiments.

FIG. 2 illustrates the dual function of the liquid. FIG. 2 shows a beaker 20 including an ink composition 200 in which particles 230 are dispersed in liquid. The ink composition 200 may include a liquid 220, for example the ink composition 200 may be formed of the liquid 220 and the particles 230. FIG. 2 also shows the composition being deposited onto a substrate 150, upon which deposition the liquid quickly migrates (e.g., by infiltration, absorption, capillary forces) into the substrate 150 as indicated by arrows, and the particles 230 thus remain on the substrate forming the amorphous array.

According to some embodiments, the substrate may be a porous substrate including pores sufficiently small to retain the particles on a surface of the substrate. The substrate may be configured (e.g., being sufficiently thin) to allow for air to escape as it is replaced by liquid, for example a substrate thickness may be selected from 40 micrometers to 5000 micrometers. In some embodiments the substrate may include a liquid absorbing layer, and in these embodiments, a thickness of the liquid absorbing layer may be selected from 40 micrometers to 5000 micrometers. The liquid absorbing layer may be deposited on a non-liquid absorbent base (e.g., glass) or on a liquid absorbent base.

According to various embodiments, the amorphous array of particles may be an amorphous colloidal array.

An aspect of the disclosure relates to a product including an indicium including a thin film in accordance with various embodiments, wherein the indicium may include an encoded pattern encoded by the relative position of the second regions to the first regions. For example, the encoded pattern may be read by reading the second regions or may be read by reading the first regions. The second regions are complementary to the first regions. The encoded pattern may be visible under specular reflection of light of a pre-determined wavelength. The pre-determined wavelength may be selected out of the range of wavelengths as defined above. According to various embodiments, the pre-determined wavelength may be in the non-visible light range. According to some embodiments, the encoded pattern is better defined under specular illumination than under diffuse illumination. The pattern may be substantially invisible to the human eye under broad-band diffuse illumination (e.g. natural diffuse illumination such as indirect sun light) and/or outside of the pre-determined wavelength and angle.

According to various embodiments, the product may be selected from a packaging, a housing, a ticket, an access card, and an identification card. Examples of identification cards are personal identification card, bank identification card, and insurance identification card.

According to various embodiments, the ink particles for forming the ink composition, or the particles of the amorphous array of particles, may be derived from any suitable materials, such as silica particles, ceramic particles, polymeric particles (e.g. poly(methyl methacrylate), phenolic resin, polystyrene (PS), carbon, melanin, polydopamine, polysulfide), metal-organic frameworks (MOFs) (e.g. Zeolitic Imidazole Framework (ZIF), ZIF-2, ZIF-8, ZIF-60, ZIF-62, ZIF-67, UiO-66, MOF-5, HKUST-1 MOF etc.), inorganic particles of metals (Au, Ag, Cu, Al etc.), semiconductors (e.g. $TiO_2$, Si), metal oxides (e.g. $Al_2O_3$, $MnO_2$, $Fe_3O_4$), hybrid polymer particles containing functional inorganic particles, porous particles (e.g. mesoporous silica, carbon, metal, polymer, or MOFs) or fluorescent particles. The ink particles may be selected from the group consisting of carbon-based particles, ceramic particles, fluorescent particles, hybrid polymeric particles containing functional inorganic particles, metallic particles, metal-organic frameworks, metal oxide particles, polymeric particles, silica particles, semiconductor particles, and combinations thereof, according to various embodiments. The particles may be dielectric particles, for example polystyrene particles.

In this regard, the expression "ink particles" in the present disclosure is used interchangeably with terms such as "colloidal ink particles", "particles", "nanoparticles or submicrometer particles". The ink particles may also be in the form of photonic crystals. Where the particles are derived from MOFs, the particles may be simply referred to as MOFs.

The ink composition may be formed using a single type of ink particles or more than one type of ink particles, such as that mentioned above. Isotropic structural colour may still be obtained even when different types of ink particles are used, as the formation of isotropic structural colour is not affected by the use of multiple types of ink particles. The use of multiple types of ink particles may result in multicoloured patterns due to colour mixing from the ink particles. As for the use of a single type of ink particle, different isotropic structural colours may be obtained even when the same type is used. For instance, $SiO_2$ particles having different average sizes of 210 nm and 240 nm may be used to create blue and cyan coloured ink compositions, respectively. The size of the ink particles, when the same type is used, may be tuned to obtain different isotropic structural colours. In some instances of colour mixing, different sized particles of the same type are printed separately to first form the individual colours before mixing. The use of different sized particles may increase polydispersity but this does not result in anisotropic colours. Colours formed using a single type of ink particles results in higher quality compared to colours formed using more than one type of ink particles.

In some embodiments, each of the ink particles may be coated with a polymer comprising a catechol group. Ink particles coated with such a polymer adhere better to the surface of the substrate. This prevents the ink particles from circulating within an ink composition that is deposited onto the substrate's surface due to Marangoni recirculation and outwards capillary flow. In such embodiments, the polymer comprising or including the catechol group may be selected from the group consisting of polydopamine, poly(norepinephrine), poly(L-3,4-dihydroxyphenylalanine), poly(5,6-dihydroxyl-1H-benzimidazole), polyphenol, dopamine-modified poly(L-glutamic acid), dopamine-modified polyphenol, dopamine-modified poly(ethyleneimine), copolymers thereof, and combinations thereof. In some embodiments, the polymer comprising the catechol group may comprise or consist of polydopamine.

According to various embodiments, an average of the size of the particles may be selected from 100 nm to 10 micrometers, for example, 120 nm to 500 nm.

Figure 3:
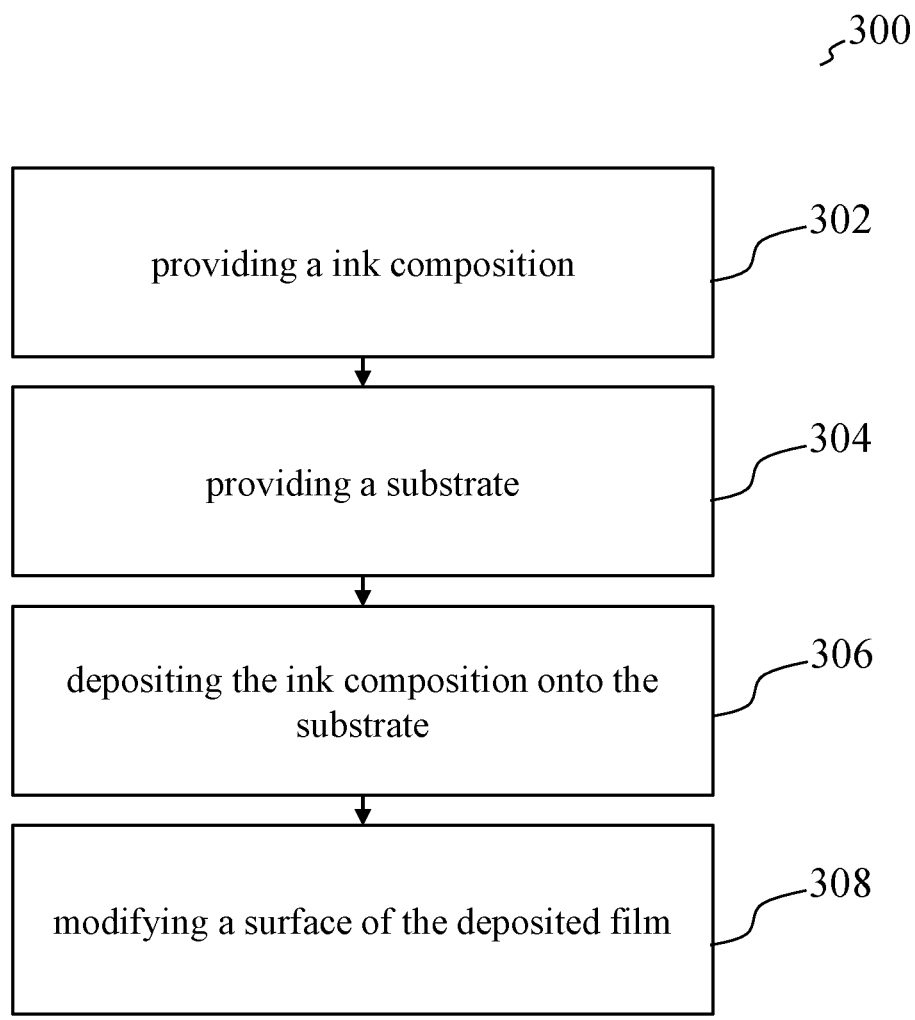
FIG. 3 shows a flowchart of the method 300, for illustration purposes, in accordance with various embodiments.

FIG. 3 shows a flowchart of the method 300 according to various embodiments, for illustration purposes. According to various embodiments, the method 300 of producing the thin film may include providing 302 an ink composition including ink particles and a liquid, for example, in the form of a colloidal dispersion of the ink particles in the liquid. The method 300 may include providing 304 the substrate configured to absorb the liquid. The method may include forming an optical thin film. Forming the optical thin film may include depositing 306 the ink composition onto the substrate, wherein the liquid may be separated from the ink particles by being drawn into the substrate (e.g., the liquid may be removed by infiltration), while the ink particles may be retained on the surface of the substrate. Forming the optical thin film may include modifying 308 a top surface of the optical thin film, which may be a surface facing away from the substrate, to at least partially suppress thin film interference, e.g., by increasing a rugosity. Modifying the top surface may include modifying selected regions of the top surface (the second regions) while leaving remaining regions (the first regions) unmodified. In the second regions, the thin film interference may be at least partially suppressed. Increasing the rugosity may include partially removing particles of a top layer of the optical thin film.

According to various embodiments, depositing the ink composition may include, for example, spin coating, spray painting, brush painting, roll-to-roll printing, roll coating, Mayer rod coating, slot dye coating, screen printing, or writing using a device (e.g. pen containing the ink composition), for depositing the ink composition on the substrate.

According to various embodiments, the roll coating may be carried out with a speed variation, for example, with a constant acceleration, thereby producing films of different thicknesses.

According to various embodiments, modifying a top surface of the optical thin film may include patterning the optical thin film into the first regions and the second regions.

Figure 4A:
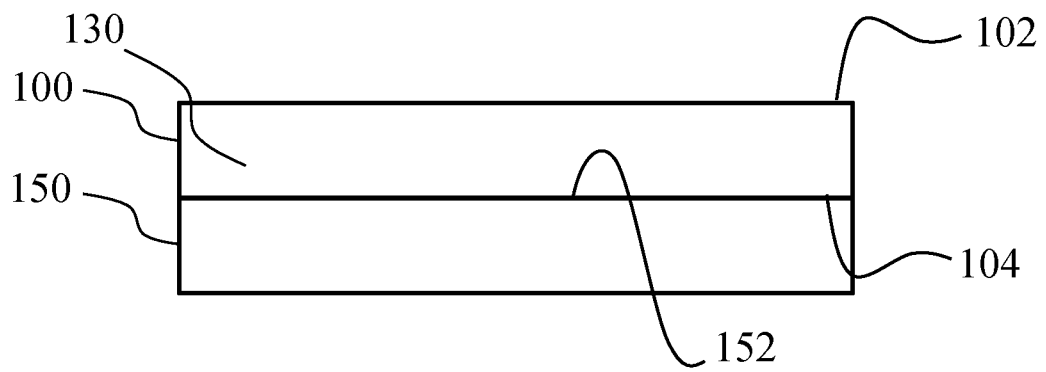
FIGS. 4A to 4C show how patterning may be carried out by using a flexible stamp 300 for illustration purposes, in accordance with various embodiments.
Figure 4B:
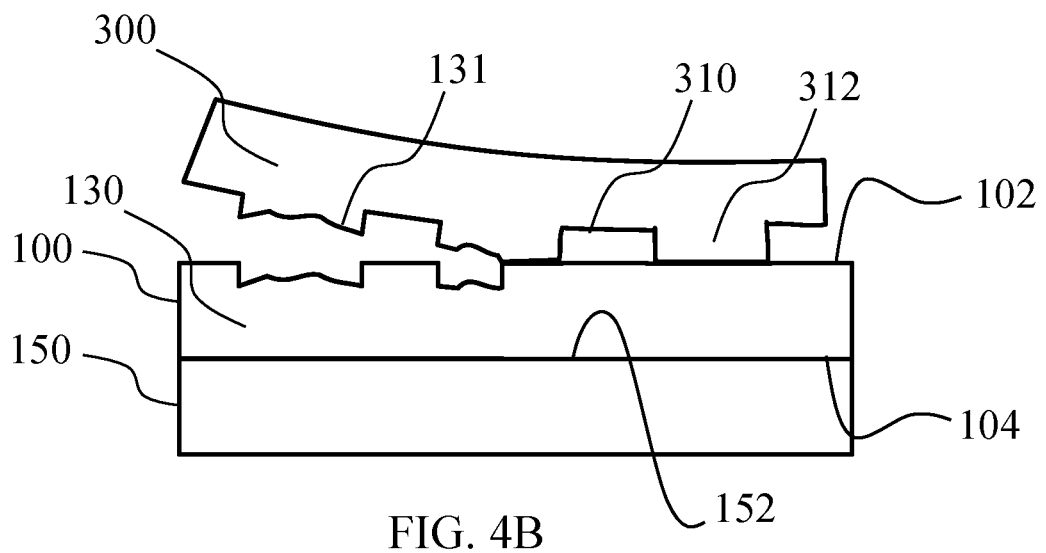
Figure 4C:
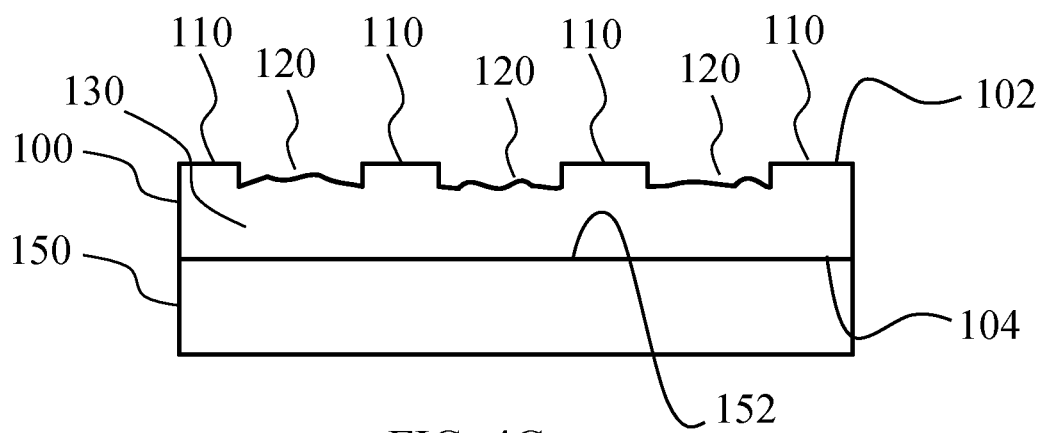

According to various embodiments, patterning may be carried out by stamp removal, for example by Polydimethylsiloxane (PDMS) lithography. FIGS. 4A to 4C illustrate steps of the patterning process using a stamp. In FIG. 4A, an optical thin film 100 is demonstrated (i.e., the thin film 100 in its intermediate form before it is patterned) comprising an amorphous array 130. The optical thin film 100 is disposed on the top surface 152 of the substrate 150 and includes a bottom surface 104 and a top surface 102. In FIG. 4B, it is shown how a stamp, in this case a flexible stamp 300 for illustration purposes, is used. The illustrated stamp 300 has areas corresponding to the first regions and areas corresponding to the second regions, for example, the stamp areas corresponding to the second regions may protrude from a stamp level, which is shown downwards as areas 312 for illustration purposes. Areas 312 contact the optical thin film 100 and, when the stamp 300 is pulled away, these areas remove material 131 from the optical thin film 100, thereby generating the second regions 120, which are illustrated as depressed and/or increased rugosity regions 120 as shown in FIG. 4C.

According to various embodiments, the substrate may be a porous substrate including pores sufficiently small to retain the particles on a surface of the substrate.

Some embodiments relate to a method to fabricate the thin film, the method may include providing a liquid-absorbent or liquid-permeable substrate. The method may further include depositing an ink composition comprising ink particles in a liquid (also termed liquid reagent) on the substrate, wherein the liquid reagent is separated from the ink particles by being drawn into the substrate. The method may further include removing top layers of one or more regions of the deposited ink particles to form one or more patterned regions. The step of depositing may include roll coating. The ink composition may include polymer particles (e.g. polystyrene particles), inorganic particles, and/or hybrid polymeric particles including functional inorganic particles, e.g., in a mixture of ethylene glycol and DI water (such as v/v 9:1). The step of removing top layers of one or more regions of the deposited ink particles may be carried out by polydimethylsiloxane lithography.

Generally, when an ink droplet comprising ink particles is deposited onto a surface, the ink particles within the droplet may self-assemble into an ordered array of structures to achieve a stable equilibrium state. As a result of these structures, different colours may be observed when the surface is viewed from different angles. For example, at one angle, the observed colour may be green, at another angle, the observed colour may be blue. The observed colours at different angles may also differ in terms of their tones (darkness or lightness), for example, green and light green. Such colours may be referred to as being angle-dependent in the present disclosure.

The ordered array of structures that give rise to the angle-dependent colours may result from colloidal crystallization of the particles caused by capillary force. During evaporation, Marangoni recirculation and outwards capillary flow exist within the ink droplet. The outwards capillary flow tends to bring the ink particles from the center to the edge of the droplet while Marangoni recirculation sets up a convection current that circulates the ink particles within the droplet, countering the outwards capillary flow. Under the influence of these two microflows within the droplet, the ink particles can self-assemble into ordered structures that are thermodynamically favourable, and result in colours that are angle-dependent.

Details of Ink Composition and Deposition

By introducing a mechanism which suppresses the colloidal crystallization, the angle-dependency issue may be addressed.

For example, the substrate onto which the ink composition is deposited is capable of imparting a force, such as capillary action, on the liquid. The substrate may, for example, draw the liquid comprised in the ink composition into and/or through the substrate, while the ink particles are retained on the surface of the substrate. In doing so, the ink particles are trapped on the substrate, as the downwards infiltration flow exerts a downwards force on the particles, so that particles do not move away from the substrate and back towards the suspension. Since the particles in certain volume of liquid removed by infiltration are fixed immediately or almost immediately to the substrate, the concentration of particles in the suspension remains nearly constant and is too low for colloidal crystallization. Disordered packing of particles is then formed.

The present approach is in contrast to methods involving removal of the liquid reagent from an ink composition by evaporation, since colloidal crystallization mechanisms, which may take place during evaporation to form the self-assembled ordered array of structures that give rise to angle-dependent colours, are not present. For the present approach, a very short amount of time, such as in the order of a few milliseconds or seconds (e.g., 1 millisecond to 1 second), may be required to remove the liquid reagent by infiltration. For example, about 1 millisecond to 4 milliseconds were required to remove the 300 pL of water droplets on AAO membranes by infiltration. In contrast thereto, a longer time, from several minutes to several hours may be required for evaporation, which may in turn depend on the temperature, humidity and the solvent used. The present mechanism for forming the isotropic nanostructures is also much simpler in execution as compared to methods such as accelerated heating, and is effective as compared to methods such as blow drying which does not result in isotropic nanostructures.

As used herein, the term "structural colours" is defined as colours which result from interaction of nanostructures with light, and includes both angle-dependent colours and angle-independent colours. Different colours may, for example, result from the same material due to differing light scattering behaviour depending on its structure such as size, shape, and/or aspect ratio.

The terms "angle-dependent colours", "non-isotropic colours" and "anisotropic structural colours" are used interchangeably herein to refer to structural colours that are not the same at different viewing angles. The term "angle-independent colours", "isotropic colours" and "isotropic structural colours", on the other hand, refer to structural colours that remain the same regardless of the angle which the structures is viewed from. Accordingly, the expression "isotropic structural colour printing" refers to the printing of ink particles that forms structures giving rise to isotropic structural colours.

The angle dependency may be determined from naked eye of a human. If the reflection peak position of the backscattering spectra of a sample derived from the present printing process does not change when the incident angle changes, the colour is considered angle-independent. This means the tone of the colour does not changed while the brightness or saturation may vary.

In the present isotropic structural colour printing process, the step of providing an ink composition may comprise mixing the ink particles with a liquid to form the ink composition.

In some embodiments, the present method may further comprise coating a layer of the polymer comprising the catechol group (e.g. polydopamine) to a thickness of 5 nm or more, or 15 nm or more, onto each of the ink particles before mixing with the liquid. This may be carried out by mixing the starting reagents for forming the ink particles with a monomer (e.g. dopamine) of the polymer, or by forming the ink particles before mixing with the monomer (e.g. dopamine). For example, in embodiments where polystyrene is used to form the ink particles, polystyrene and dopamine may be mixed together and stirred overnight to form the polydopamine coated polystyrene (PS@PDA) ink particles. Coating each of the particles with a polymer comprising a catechol group (e.g. polydopamine) to a thickness of 15 nm or more provides for a higher success of coating the polymer onto the particles. In embodiments where polydopamine is used, it improves adhesion of the polydopamine coated particles to a substrate.

Additionally, when the particles are adhered to the substrate, they may be prevented from aggregating and crystallizing to form larger particles and/or arranging themselves into an ordered array, whereby such an ordered array results in non-isotropic structural colours.

The coating of a polymer comprising a catechol group has another advantage in that the polymer absorbs light scattered by the ACA as the polymer (e.g. polydopamine) tends to be dark or black in colour. This also helps to improve quality of the structural colour as the ACA tends to display a pale colour under natural light with increasing thickness due to mutiple light scattering. The polymer absorbs the scattered light, thereby improving the quality.

It is mentioned herein that even in embodiments whereby the ink particles are not coated with the polymer comprising a catechol group, such ink particles may still be used to form nanostructures that give rise to isotropic structural colour, as formation of the isotropic structural colour may result from the removal and/or separation of the liquid from the ink composition containing the ink particles by the underlying substrate. The liquid may, for example, be removed and/or separated from the ink particles, such that the particles are not able to assemble into an ordered array of structures, thereby giving rise to isotropic structural colours.

The ink particles may be of any shape, and may have a plurality of sizes. Each of the ink particles may have a shape selected from the group consisting of spheres, cubes, octahedrons, rhombic dodecahedrons, rods, discs, truncated rhombic dodecahedrons, hexagonal prisms, and combinations thereof. The sizes may have a coefficient of variation of 30% or less. Based on this coefficient of variation, an ink composition with monodispersed ink particles may be formed. While monodispersed ink particles may be used, polydispersed ink particles help to enhance formation of an amorphous arrangement of the ink particles on a substrate's surface.

In various embodiments, providing the ink composition may include mixing the ink particles in the liquid, wherein the ink particles comprise a plurality of sizes having a coefficient of variation of 30% or less. The size of a particle may refer to the longest distance measured from one end to another end of the particle. For example, when the particle is a perfect sphere, the size then refers to the diameter.

The liquid may be mixed with the ink particles to form a suspension, such as a colloidal ink suspension. The liquid may accordingly provide for printability of the ink composition on the substrate.

The liquid may comprise or consist of a dispersion medium. The liquid may also include a thickening agent for tuning the viscosity of the ink to facilitate printing. In some embodiments, the liquid may include the dispersion medium and thickening agent. In some embodiments, the liquid does not contain the thickening agent.

The dispersion medium is used to disperse the ink particles in the ink composition. Any suitable liquid may be used as the dispersion medium as long as the ink particles can be dispersed therein. Non-limiting examples of the dispersion medium include chloroform, dimethylformamide, ethyl acetate, glycerin, isopropyl alcohol, tetrahydrofuran and water. In various embodiments, the dispersion medium may be selected from chloroform, dimethylformamide, ethyl acetate, glycerin, isopropyl alcohol, tetrahydrofuran, water, and combinations thereof. Depending on the dispersion medium used, the liquid may be an aqueous or an organic liquid.

Meanwhile, the thickening agent may be used to control viscosity of the ink composition. For example, it may be used to increase viscosity of the ink composition so as to control flowability, hence printability, of the ink composition. For example, a thickening agent may be included in a liquid reagent so as to moderate viscosity of the ink composition, such that the ink composition is able to maintain a specific printed pattern on a substrate. Different thickening agents and amounts of the thickening agent may be used depending on the type of dispersion medium used. In some embodiments, the thickening agent may comprise or consist of ethylene glycol, polyurethanes, acrylic polymers, latex, styrene, butadiene, polyvinyl alcohol, cellulosic derivatives and/or gelatin. Other thickening agents suitable for the purpose as described above may also be used. In some instances, a thinning agent may be used if the ink is too viscous. For example, the thinning agent may be a liquid or a mixture of liquids that is miscible but not reactive with the dispersion medium. In most instances, a thinning agent is not needed.

The thickening agent may be added after the ink particles are dispersed in the dispersion medium. For example, uncoated polystyrene particles and/or polystyrene ink particles coated with polydopamine may be mixed with water before ethyelene glycol is added to form the ink composition.

Once the ink composition is prepared, the ink composition may be deposited, by any suitable means, onto a surface of a substrate. Such suitable means may include, without being limited to, spin coating, spray painting, brush painting, roll-to-roll printing, Mayer rod coating, slot dye coating and/or writing using a device (e.g. pen containing the ink composition). In the present process, no intervening layer or material may be required for depositing the ink composition onto the surface of the substrate. In other words, the ink composition may be directly deposited onto the surface of the substrate.

Details of the Substrate

Any material may be used as the substrate as long as they are capable of drawing liquid of an ink composition into the substrate such that it mitigates Marangoni recirculation, outwards capillary flow and/or colloidal crystallization that hinder derivation of isotropic structural colours. In other words, the substrate need not be a porous substrate as long as the substrate can absorb liquid into the substrate. In various embodiments, the step of depositing the ink composition is carried out on a substrate which is liquid-absorbent or liquid-permeable.

A liquid-absorbent substrate may be a substrate made from material(s) that can absorb liquid. Such liquid-absorbent substrate may include superabsorbent polymers such as sodium polyacrylate, polyacrylamide copolymer, cross-linked carboxymethyl cellulose, cross-linked carboxymethyl cellulose, polyvinyl alcohol copolymer, hydrogels or oil absorption polymers, etc. Non-limiting examples of polyacrylamide copolymers may include poly(acrylamide-co-acrylic acid) and poly(2-acrylamido-2-methyl-1-propane-sulphonic acid-co-acrylonitrile). A non-limiting example of a polyvinyl alcohol copolymer may be poly(vinyl alcohol-co-ethylene). A superabsorbent polymer refers to a polymer that absorbs and retains an extremely large amount of liquid relative to their own mass. In embodiments where a liquid-absorbent substrate is used, depositing the ink composition on such a substrate may comprise absorbing the liquid into the porous substrate by ionic bond, covalent bond, hydrogen bond or van der Waals force. A liquid-permeable substrate, on the other hand, allows the liquid to permeate through the substrate.

By using a liquid-absorbent substrate, the substrate is able to draw the liquid comprised in the ink composition into the substrate. This in turn drives the ink particles towards and onto the substrate's surface, thereby mitigating the effects of colloidal crystallization within a deposited ink droplet, to form structures that give rise to isotropic structural colours. Both the liquid-absorbent substrate and the liquid-permeable substrate also mitigate colloidal crystallization that leads to non-isotropic structural colours.

With the above in mind, it is possible for a substrate formed from a non-absorbent material such as glass to be rendered liquid-absorbent or liquid-permeable by virtue of pores in the substrate that allow permeation of the liquid therethrough. The substrate may accordingly be any suitable material, and may in embodiments be selected from the group consisting of a membrane, a glass, a paper, fibers, a plastic, a silica-based material, a fabric, a polymer, a hydrogel, and combinations thereof. In some embodiments, the substrate is an anodic aluminum oxide (AAO) membrane or an absorbent photo paper, for example a glossy photo paper. In the examples, and in accordance with various embodiments, "photo paper with cracks" refers to photo paper of a lower quality, in which cracks of 100 µm length and widths of several nanometers, e.g., of from 10 nm to 500 nm, can be seen in microscopy images, e.g., SEM, for example one or more cracks within an area of 0.25 mm$^2$ of the photo paper; otherwise "photo paper" or "glossy photo paper" without referring to cracks mean that the film is free from said cracks, e.g., no such cracks can be seen in microscopy images.

In some embodiments, the substrate may be a porous substrate. The step of depositing the ink composition, according to some embodiments, may be carried out on a porous substrate comprising pores having a pore size which retains essentially all of the ink particles on the surface of the substrate. This implies that the pores should be sized to at least exclude all ink particles from passing through the substrate. The pore size at the surface of the substrate may be from 1 nm to any size that allows formation of an ACA on the substrate, and this includes pore sizes that may be the same as or larger than the average diameter of the ink particles. When the pore size at the surface of the substrate is same or larger than the average size of the ink particles, the deposition of ink particles into such pores causes pore blockage, thereby reducing the effective pore size and retaining the ink particles on the substrate. In some embodiments, the pore sizes may be in the range of 0.1 nm to 2 µm. In some embodiments, the ink particles may have an average size of 250 nm.

In some embodiments, the present process may further comprise modifying a surface of the substrate to become lipophilic, lipophobic, hydrophilic, hydrophobic, neutral, positively charged and/or negatively charged prior to depositing the ink composition, to enhance compatibility with the system for printing the ink particles. For example, silane coupling agents or click chemistry to introduce —OH, —COOH groups to make the substrate hydrophilic may be carried out. In other instances, molecules containing hydrophobic and lipophobic groups such as —$C_8H_{17}$, —$C_{16}H_{33}$, etc. may be used to modify the substrate. In other instances, both modification strategies may be carried out to make the substrate hydrophobic and lipophobic.

Different areas of the same substrate may be modified differently to allow adhesion of different ink particles to the substrate, which may translate in different isotropic structure colours on the different areas of the substrate.

By the term "essentially all", this means that at least 50%, such as at least 90%, at least 92%, at least 95%, or at least 98% of the ink particles are retained on the surface of the substrate.

According to the present process, the step of depositing the ink composition may comprise absorbing the liquid into the porous substrate by capillary action. In other words, the pores of the substrate may be sized such that they draw liquid into the substrate, or at least sized to provide for capillary action on the liquid, while retaining the ink particles on the surface of the substrate. The pores on the substrate's surface may be connected to tortuous channels within the substrate. The tortuous channels should be sized at least to provide for capillary action to draw liquid further into the substrate.

When the ink particles are deposited onto the surface of the substrate as a result of capillary action and/or absorption of the liquid, the ink particles may form an amorphous arrangement of structures that lead to isotropic structural colour. These amorphous structures may be uniform microstructures or nanostructures, which may be collectively referred to as nanostructures in the present disclosure. In various embodiments of the present process, the nanostructures may be arranged as an amorphous layer of isotropic structures, which gives rise to isotropic structural colours.

The present method may further comprise drying the ink particles on the surface of the substrate. Drying of the ink particles may be carried out at any humidity. Pressure and temperature at which the drying is carried out, may be selected to be lower than boiling point and higher than freezing point of the ink composition. The complete removal or separation of the liquid may range from 0.1 milliseconds to several seconds or minutes.

EXAMPLES

In examples, ink compositions may be prepared by dispersing 40 to 200 mg of PS particles (a size of the particles was selected according to the experiment, for example, 180 nm, 230 nm or 260 nm particles are used) in a liquid comprising 0.1 mL ethylene glycol and 0.9 mL deionized (DI) water. Commercial Epson glossy photo papers and photo papers with cracks were used as exemplary substrates.

Example 1

Figure 5:
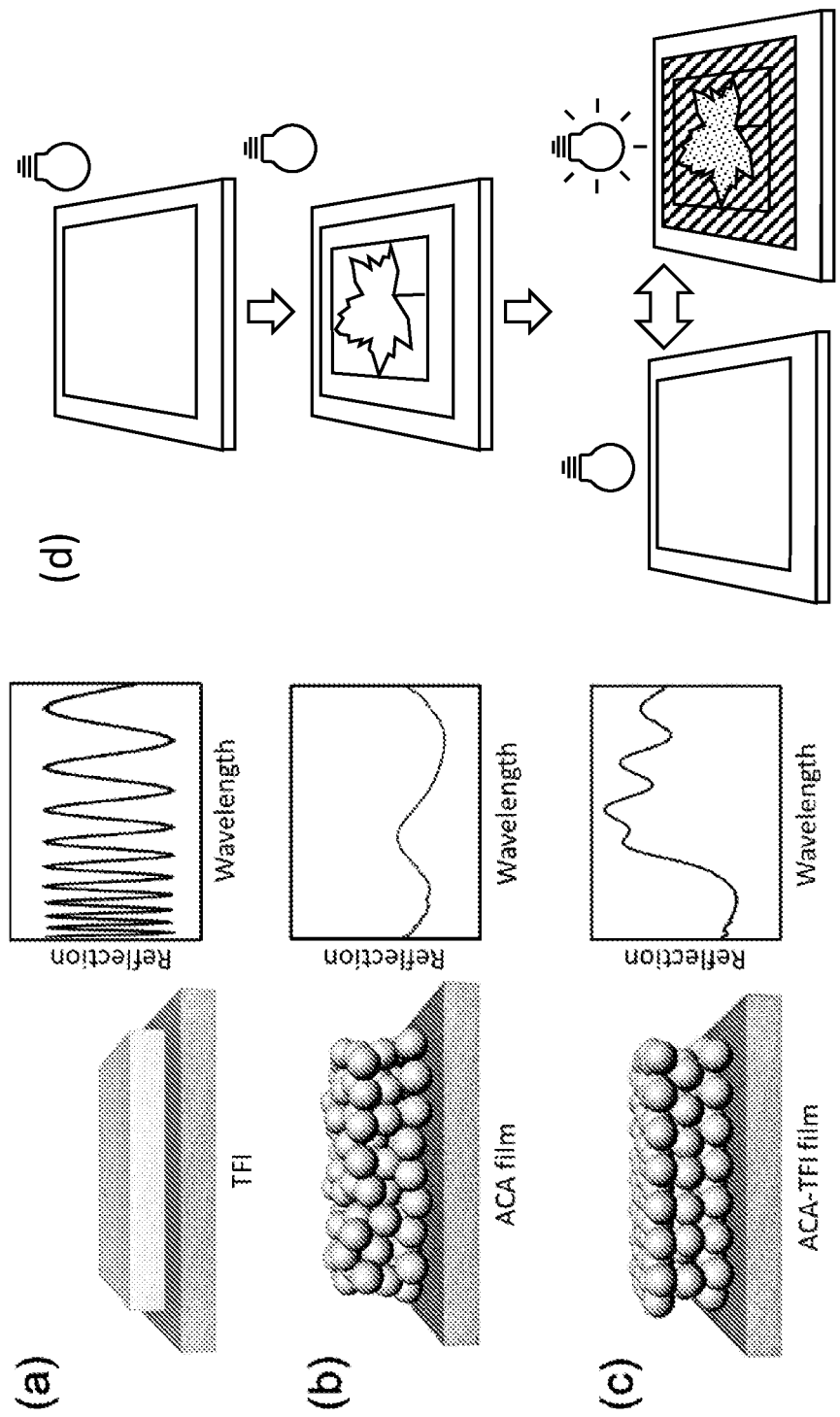
FIG. 5 shows an illustration of photonic coupling modes of thin-film interference and coherent scattering of ACAs in various examples.

FIG. 5 shows an illustration of photonic coupling modes of (a) thin-film interference, (b) coherent scattering of ACAs (e.g., as in the second regions), (c) modulation of both modes (e.g., as in the first regions), and the corresponding representative reflection spectra. The schematic view of particles of the ACA in FIG. 5(c) is to highlight that the surface of the thin film is flat, however the film is not ordered since it is an ACA. FIG. 5(d) shows the fabrication process of HDPS anti-counterfeiting indicium (e.g., labels) by micro-imprinting (a form of patterning) and the authorization process by specular lighting. The disordered structures of the ACAs endowed the films with near-isotropic colors under natural light, whereas the collective effects of TFI and coherent scattering lead to brighter mixed colors and special reflectance under specular illumination, as illustrated in FIG. 5. By varying the thicknesses or sizes of the building blocks of ACA-TFI films, the interplay between coherent scattering and TFI effects can be flexibly well-modulated to provide special optical features. More importantly, the TFI of the films can be manipulated by modifying the surface, for example, removal of particles from the surface of the films via micro-imprinting methods, allowing for the creation of HDPSs with encoded photonic structures and tailored optical features for anti-counterfeiting purposes. As illustrated in FIG. 5(d), the imprinted pattern in HDPSs (illustrated as maple leaf representing second regions) was covert in natural light, but easily revealed upon strong illumination. In addition, the controllable coating procedures enables the continuous tuning of the optical features of ACA-TFI films by the adjustment of the thickness, for example, by adjusting the coating speed. Anti-counterfeiting HDPS labels with sophisticated optical variable features may be developed, demonstrating the potential of the method to create infinite optical coding for high-level anti-counterfeiting.

Example 2

Figure 6:
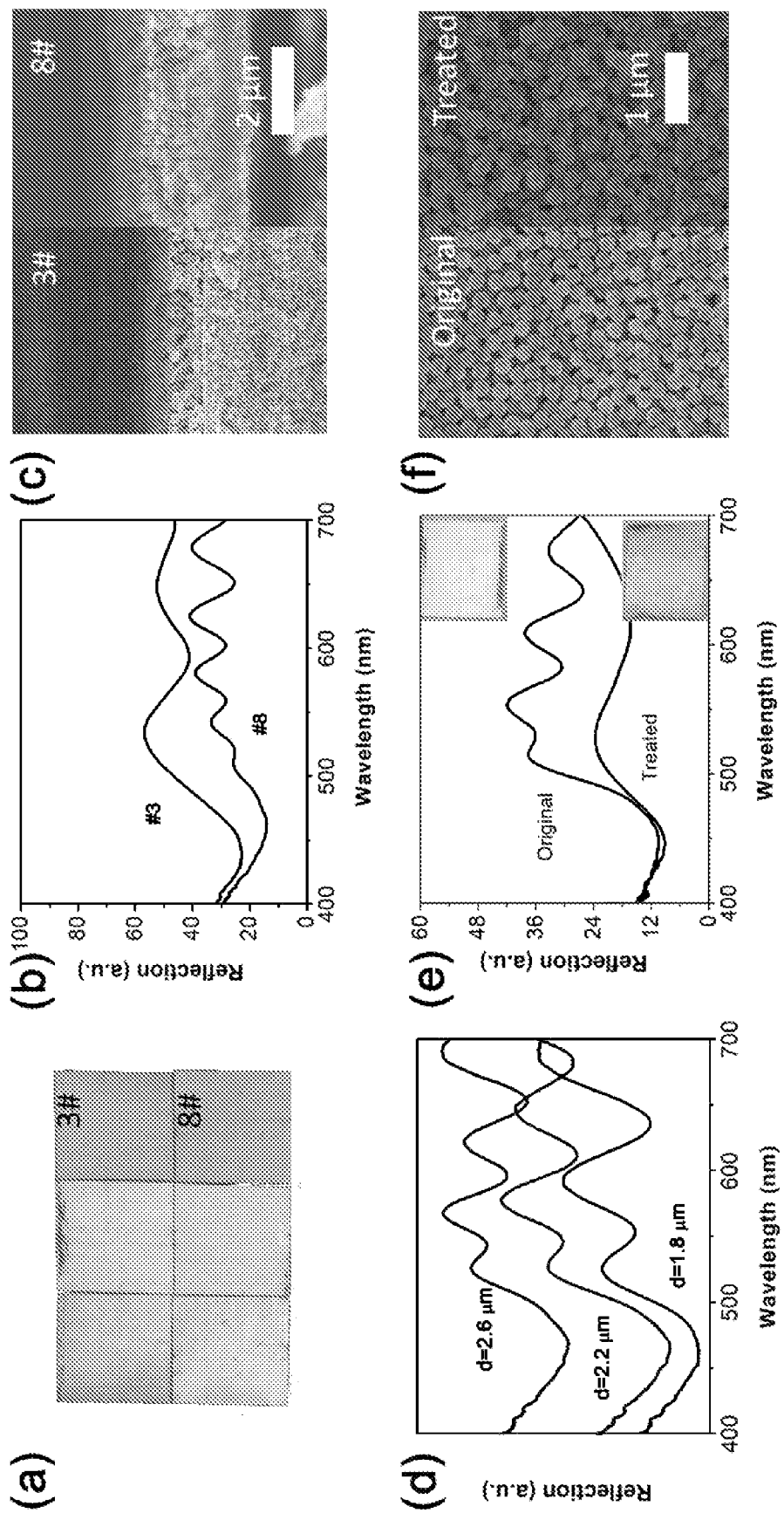
FIG. 6 shows optical properties of optical thin films, in accordance with various embodiments.

FIG. 6 shows optical properties of optical thin films, prepared as described below. FIG. 6(a) shows photographs of coated ACA-TFI films under strong illumination. FIG. 6(b) shows reflectance of the green ACA-TFI films #3 (top line) and #8 (bottom line). FIG. 6(c) shows cross-sectional SEM images of green ACA-TFI films #3 and #8. FIG. 6(d) shows the reflectance of three ACA-TFI films with different thicknesses (bottom: d=1.8 μm; middle: d=2.2 μm; top: d=2.6 μm). FIG. 6(e) shows the reflectance and photographs (inset images) of the original (top line) and Scotch tape-treated (bottom line) films. FIG. 6(f) shows top-view SEM images of the original and treated ACA-TFI films.

Optical thin films, also termed as ACA-TFI films, with uniform thickness were prepared, in examples, by infiltration-assisted Mayer rod coating of colloidal inks onto glossy photo papers. The Mayer rods wound with wires of different diameters afford precisely controlled thickness of liquid thin films. Standard #3 and #8 wire-wound rods that are expected to deposit a wet film with a theoretical thickness of 7.6 and 20.3 μm respectively were used for the rod-coating. When a colloidal ink of polystyrene (PS) particles (20 wt %) was coated on the photo paper at a speed of 50 cm s$^{-1}$, the ink films formed by Mayer rods dried immediately due to the rapid removal of water by downwards infiltration. Photographs of three groups of ACA-TFI films with blue, green, and red colors coated by #3 or #8 Mayer rods are shown in FIG. 6(a). The reflective spectra (FIG. 6(b)) of the green ACA-TFI films #3 (top line) and #8 (bottom line) with average thicknesses of 1.24±0.06 μm and 3.13±0.1 μm, respectively (FIG. 6(c)), were first measured. It was found that the thicker film #8 showed typical fringe-like patterns of TFI, whereas two reflection peaks at 534 and 640 nm were observed for thinner film #3.

Figure 7:
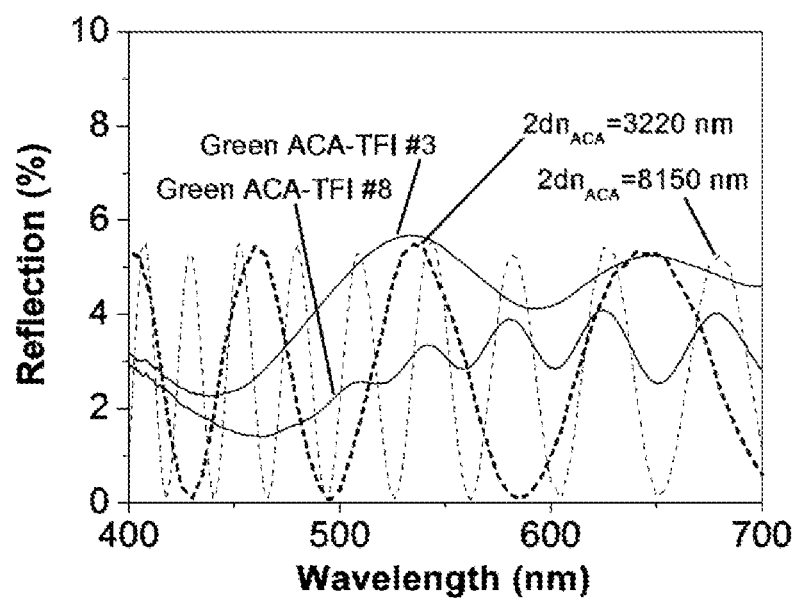
FIG. 7 shows results of theoretical simulations of TFI with $2n_{ACA}d$ of 3.22 or 8.15 µm, in accordance with various embodiments.
Figure 8:
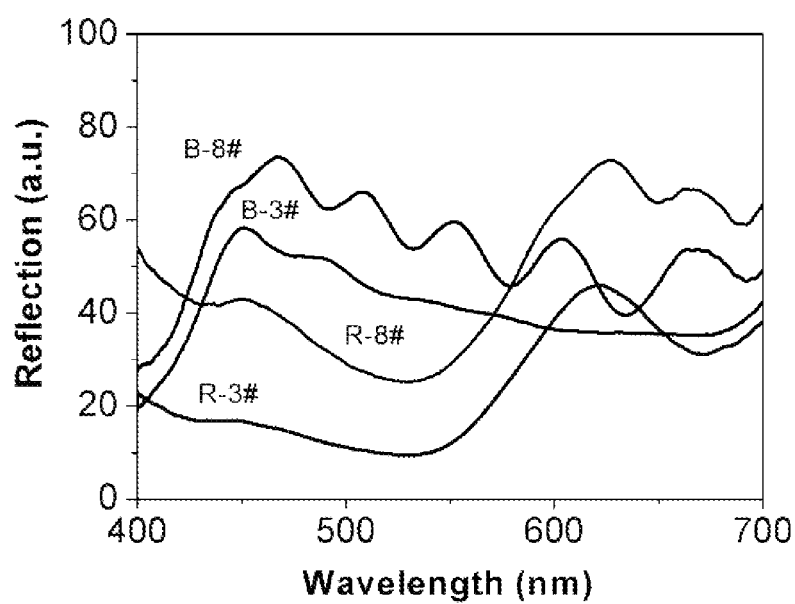
FIG. 8 shows reflection spectra of the blue and red ACA-TFI films as prepared according to examples.
Figure 9:
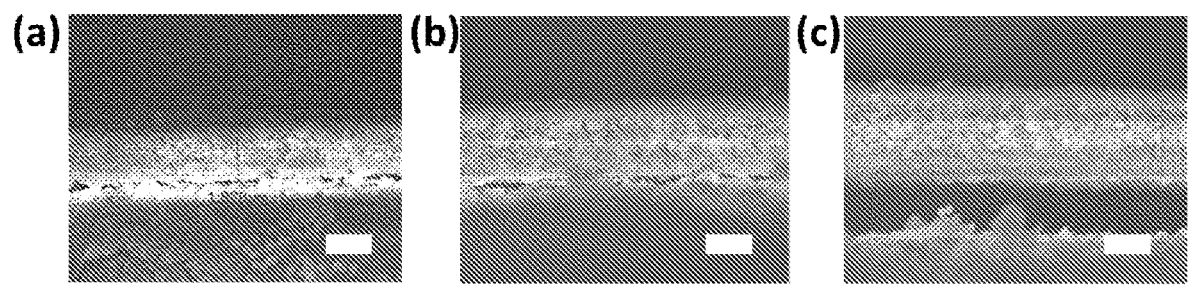
FIG. 9 shows scanning electron microscopy (SEM) images of ACA-TFI films with an average thickness of 1.83 µm (FIG. 9(a)), 2.22 µm (FIGS. 9(b)), and 2.6 µm (FIG. 9(c)) fabricated by coating 12, 14 and 16 wt % PS inks, respectively, at a speed of 50 cm/s, in accordance with various embodiments.

According to various embodiments, the reflection peak positions of constructive interference of the thin film can be expressed by Eq. (1) above. The value of m together with the total optical lengths (e.g., $2n_{ACA}d=8.15$ μm for film #8) may be obtained, and the $n_{ACA}$ may be calculated, which, in the example, is 1.3. For the film #3 of the same $n_{ACA}$ of 1.3, if it is assumed the reflection peaks are caused by TFI, the $2n_{ACA}d$ of film #3 is calculated to be 3.22 μm. Theoretical simulations of TFI may be carried out. For example, simulation results for $2n_{ACA}d$ of 3.22 or 8.15 μm are plotted in FIG. 7. The simulated peaks fit well with those of the measured spectra of ACA-TFI films, indicating the reflection peaks of films #3 and #8 were all caused by TFI effects. The reflection spectra of the blue and red ACA-TFI films were measured afterwards, as shown in FIG. 8. It was found that due to the collective effects of coherent scattering and TFI, the #8 films and #3 blue ACA-TFI film all displayed modulated reflection spectra with fringe-like TFI peaks. The red film #3 only displayed one peak in the visible light region, as other TFI peaks of the film fell within the near-infrared or infrared regions. The thickness of the ACA-TFI films may be tailored by using particles, e.g., PS inks, of different concentrations for coating. The ACA-TFI films with an average thickness of 1.83, 2.22, and 2.6 μm (FIG. 9) fabricated by coating 12, 14 and 16 wt % PS inks, respectively, at a speed of 50 cm/s displayed distinct reflectance, as shown in FIG. 6(d). According to the fringe peak positions, the $2n_{ACA}d$ of the films are calculated to be 4.74, 5.77 and 6.8 μm, which correspond to an average $n_{ACA}$ of 1.3±0.05 for these films.

Example 3

Figure 10:
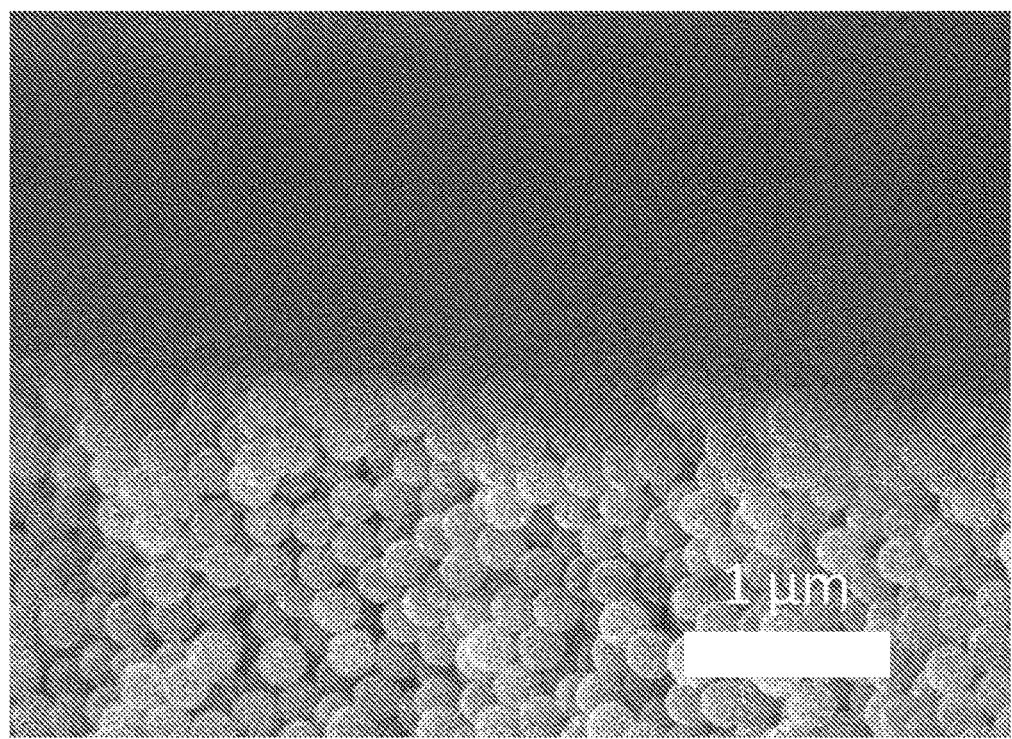
FIG. 10 shows a cross-sectional SEM image of an ACA-TFI film.
Figure 11:
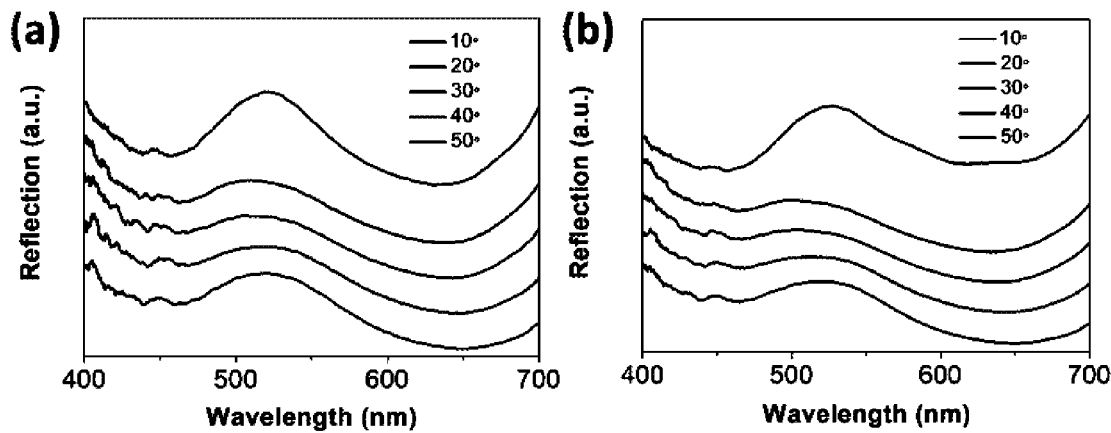
FIG. 11 shows examples of reflection spectra of ACA-TFI films at different angles, showing backscattering peaks of the treated film slightly moving from 10° to 50°, whereas TFI patterns diminished.
Figure 12:
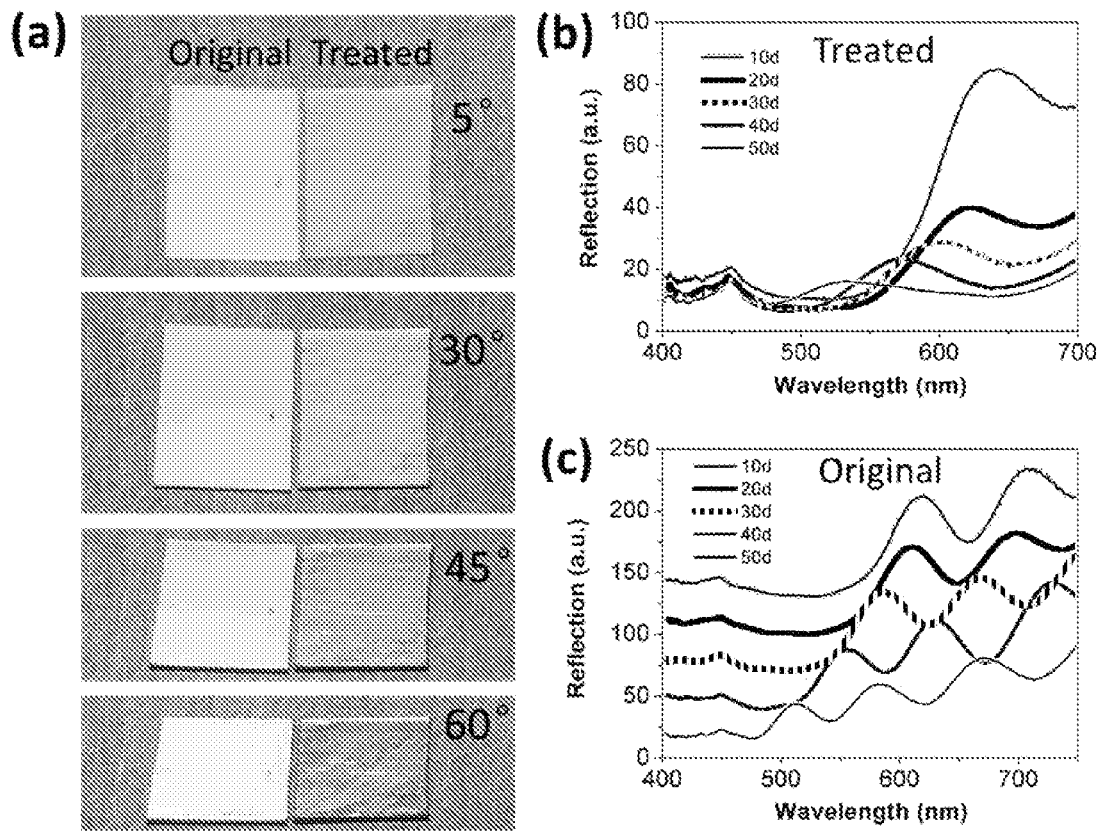
FIG. 12 displays the typical angle-dependent color shifts of two red ACA-TFI films with an initial $2n_{ACA}d$ of 4.96 µm before and after Scotch tape treatment.
Figure 13:
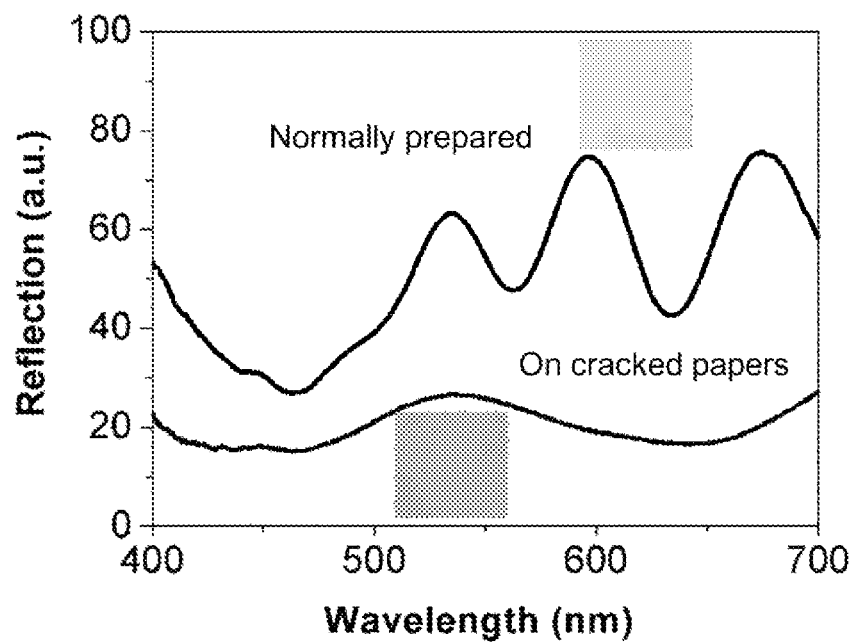
FIG. 13 shows reflection spectra comparison of normally prepared films and films with cracks, in accordance with various embodiments.
Figure 14:
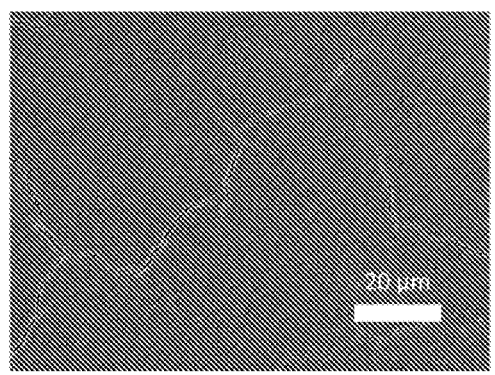
FIG. 14 shows a top SEM image of a treated film showing cracks, in accordance with various embodiments.
Figure 15:
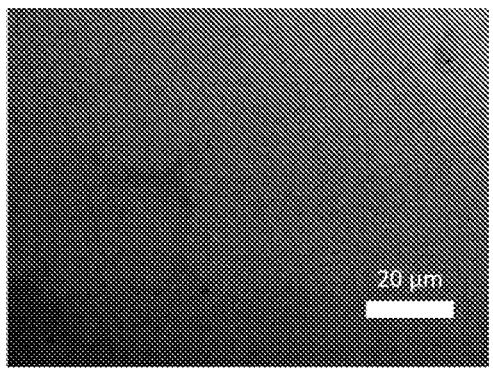
FIG. 15 shows a top SEM image of a normally prepared film, in accordance with various embodiments.
Figure 16:
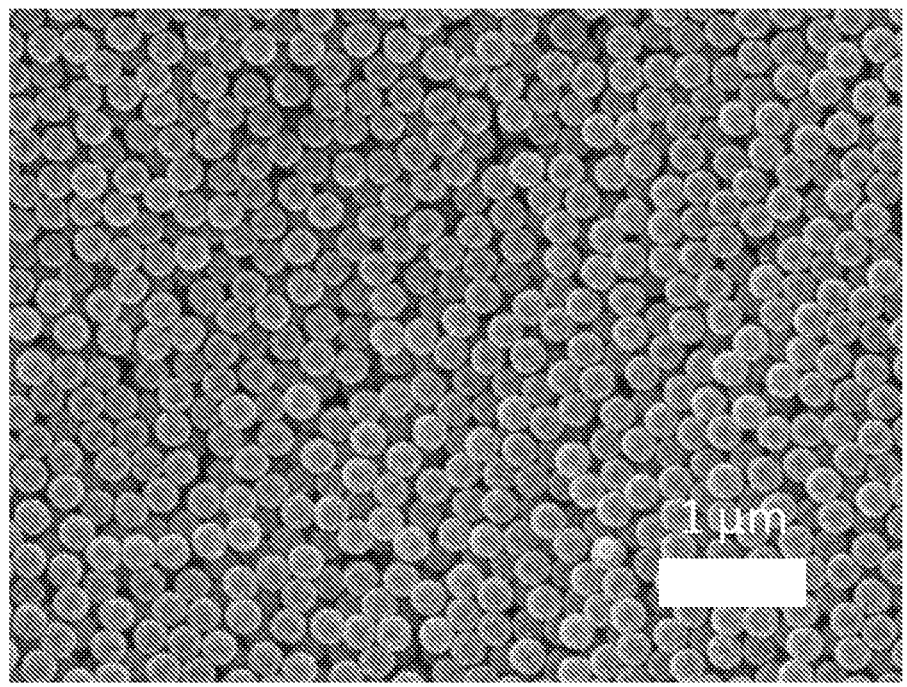
FIG. 16 is a magnification of a portion of FIG. 15.

To modify the combined optical properties of the optical thin film, a pressure-sensitive tape (e.g., Scotch tape) may be used to remove top layers of particles from the ACA-TFI films, as displayed in FIG. 6(e). Other methods of treating the surface, e.g., patterning, may be used. The original ACA-TFI film (illustrating properties of the first regions) with a $2n_{ACA}d$ of 6.09 μm displayed a mixed golden color due to the combined optical effects, whereas the treated film (illustrating properties of the second regions) showed pure green color with only one reflection peak in its spectrum, indicating a suppression of the TFI mode. Scanning electron microscopy (SEM) images of ACA-TFI films in FIG. 6(f) reveal smooth surfaces of the original films, which was confirmed by the cross-sectional SEM image (FIG. 10). In contrast, the roughness of the films increased considerably after the tape treatment, which is theorized to effect the suppression of TFI effects. The backscattering spectra of both films were measured for different rotation angles. As plotted in FIG. 11, the backscattering peaks of the treated film slightly moved from 10° to 50°, whereas TFI patterns were diminished in the ACA-TFI film and only backscattering peaks were observed in the spectra, which were close to the treated films. As such, the colors of both films are similar and are dominated by the coherent scattering in the backscattering mode. FIG. 12(a) displays the typical angle-dependent color shifts of two red ACA-TFI films with an initial $2n_{ACA}d$ of 4.96 µm before and after Scotch tape treatment. The treated film displayed an iridescent color that shifted from red to blue when the incident/viewing angles were varied from 5° to 60°, which is in line with its reflective spectra in FIG. 12(b). On the other hand, the ACA-TFI film displayed entirely different color-shifting properties. When the incident/viewing angles were varied from 30° to 60°, the fringe patterns blue-shifted. In this case, the constant co-existence of the reflection peaks that correspond to the wavelength regions of red and green colors (FIG. 12(c)) resulted in mixed golden colors. Notably, the TFI pattern was absent in ACA films (FIG. 13) coated on photo papers with cracks (FIG. 14), which led to uneven thicknesses (FIG. 16). In contrast, the ACA-TFI film fabricated using the same coating parameters on glossy photo papers without cracks (FIG. 15) displayed a much brighter yellow color with a higher reflection intensity.

Example 4

Figure 17:
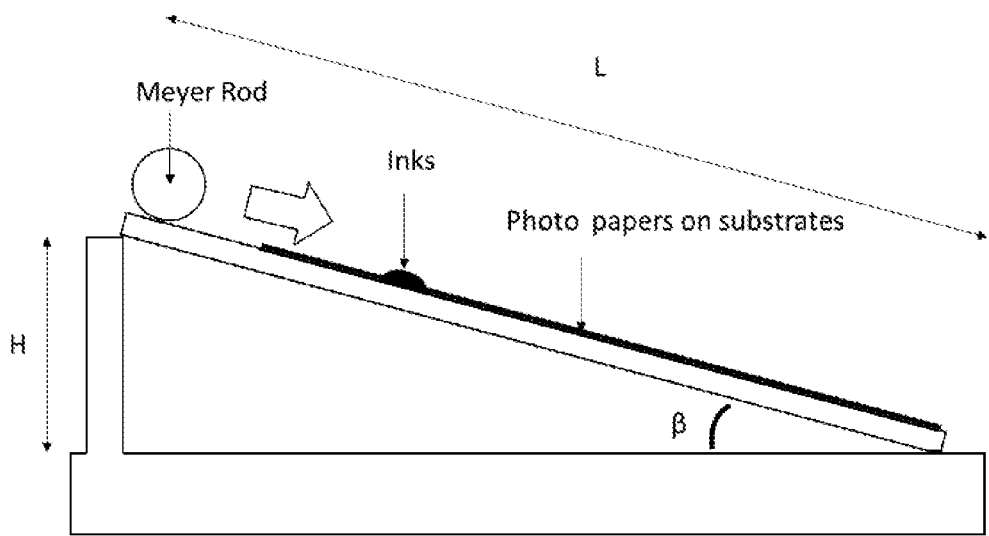
FIG. 17 illustrates an example of how to prepare ACA-TFI films with continuously changing thicknesses.
Figure 18:
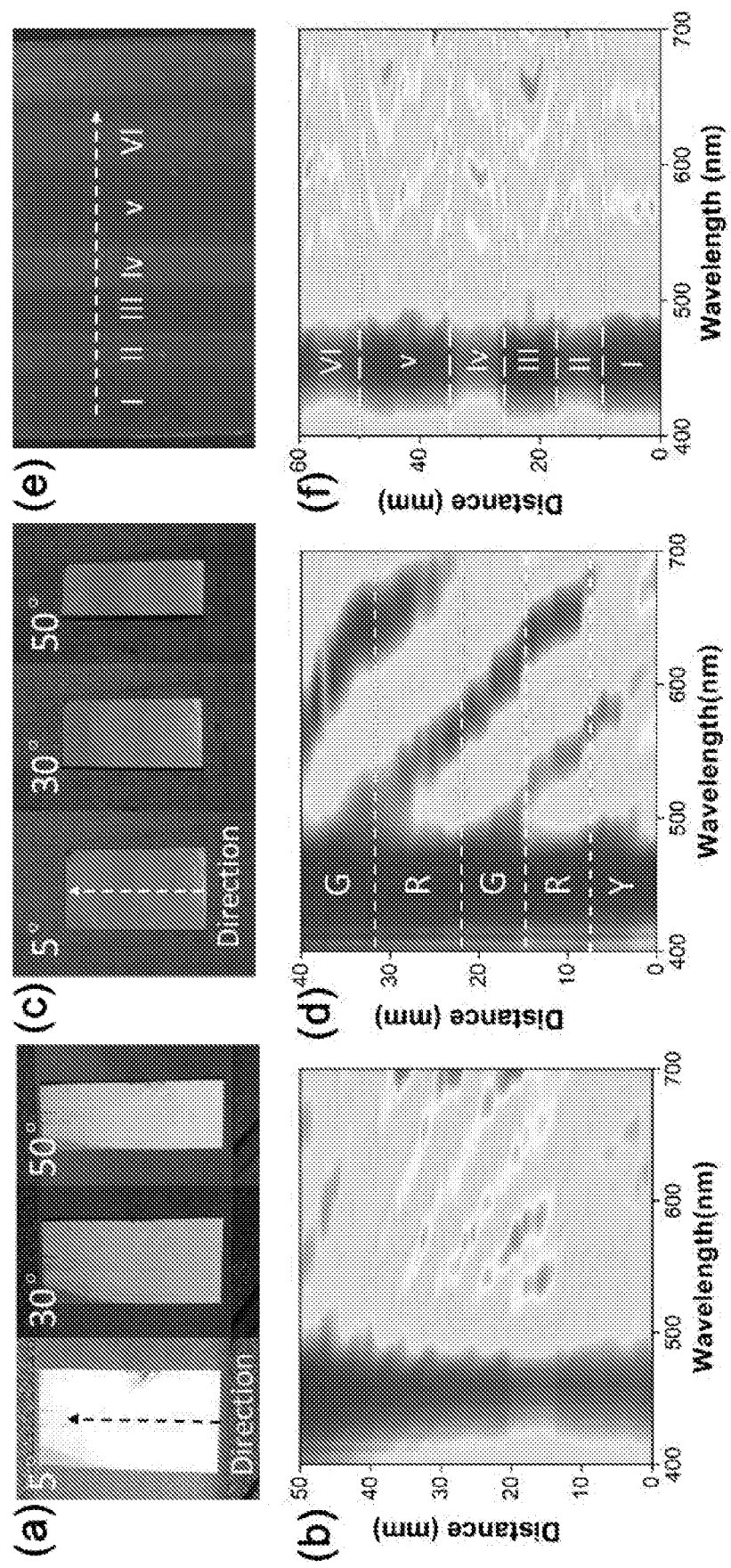
FIG. 18 shows images and corresponding heatmaps of reflectance spectra, with reflectance represented by the colors and the wavelength represented in the horizontal axis, for different positions on the thin films (distance) represented in the vertical axis, the distance continuously changing $2n_{ACA}d$ from 8.1 µm to 3.6 µm, in accordance with various embodiments.
Figure 19:
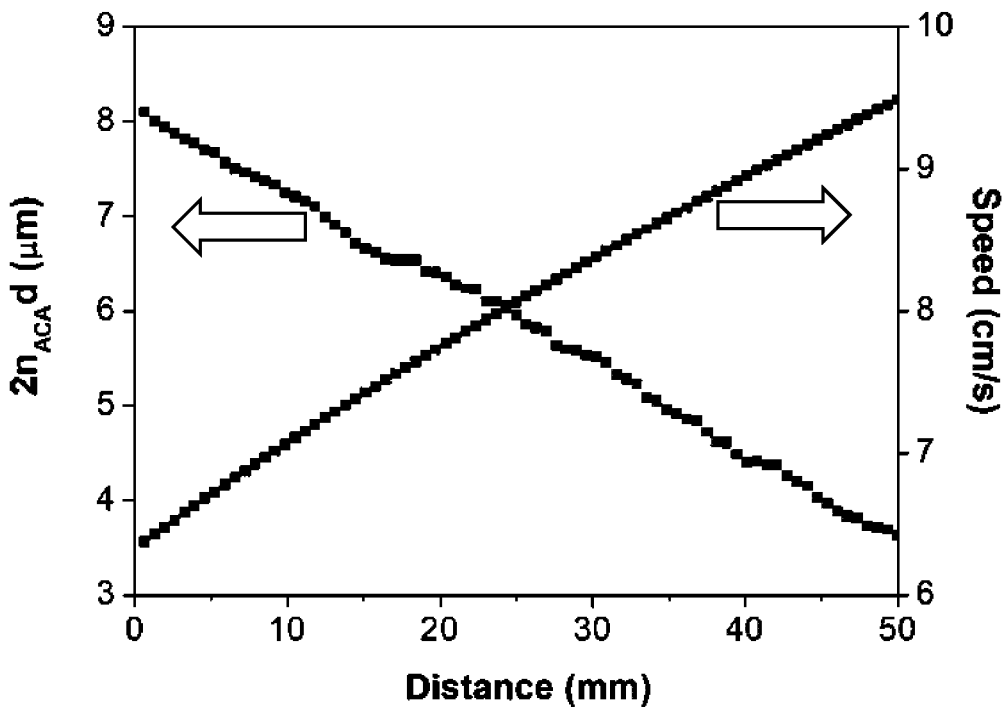
FIG. 19 shows how the optical length and speed vary with distance for a thin film made in accordance with various embodiments.
Figure 20:
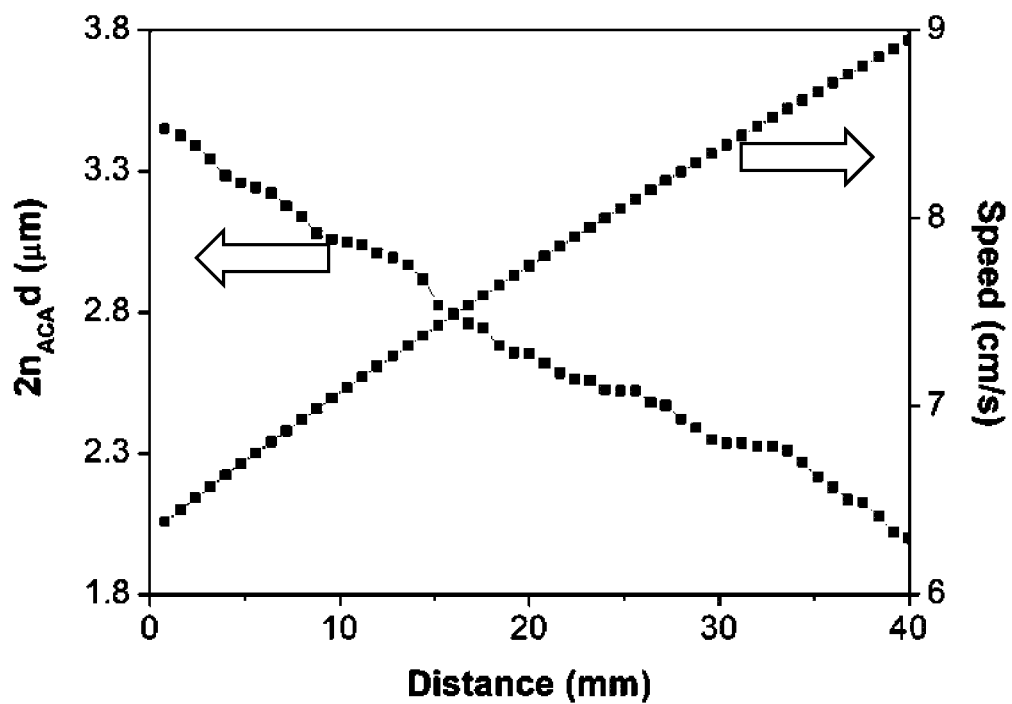
FIG. 20 shows how the optical length and speed vary with distance for another thin film made in accordance with various embodiments.

FIG. 17 illustrates an example of how to prepare ACA-TFI films with continuously varying thicknesses. In FIG. 18, optical images are shown of ACA-TFI films with continuously changing $2n_{ACA}d$ from (a) 8.1 to 3.6 µm and (c) 3.45 to 2 µm at different incident/viewing angles, or (e) strip pattern coated at varying speeds. In FIG. 18 (b, d, f) the color maps show the continuous reflectance changes of the corresponding films along the marked lines. To further investigate the collective optical properties, ACA-TFI films of different thicknesses were prepared on a slope-like device (FIG. 17) by continuously changing the coating speed. The inks were first dropped at the edge of the paper, and then a Mayer rod was placed on the paper to roll down automatically due to the gravity, leading to increasing coating speeds, for example with an acceleration (a) of 0.2 m/s² at a slope angle of 2.2°. As the time t needed to coat a fixed distance (L=0.5 at²) was easily measured, the acceleration or the real-time speed (V=at) at a certain point could be calculated as well. ACA-TFI films (FIG. 18(a)) with continuously changing $2n_{ACA}d$ from 8.1 µm to 3.6 µm were prepared by coating 8 wt % 230 nm PS inks at an increasing speed from 6.4 cm/s to 9.5 cm/s (FIG. 19). Upon specular reflection illumination, the whole film displayed uniform mixed gold colors. By increasing the incident/viewing angles from 5° to 30° or 50°, the color of the film changed from green-cyan to light cyan due to the combined optical effects. The reflectance spectra of the film along the marked line was measured, and plotted in a color map (FIG. 18(b)). The reflection intensities from 100% to 10% are represented by colors from red to blue, while the red/yellow colors at a certain distance represent corresponding reflection peaks. With the increase in coating distance, the reflection peaks of the films blue-shifted due to the continuous decrease in the film thickness along the coating direction. Interestingly, due to the existence of multiple reflection peaks, the difference in their reflectance or resultant mixed colors could hardly be distinguished by human eyes. Next, ACA-TFI films with continuously decreasing $2n_{ACA}d$ from 3.45 to 2 µm were obtained by coating 4 wt % 230 nm PS inks at speeds from 6.4 to 8.9 cm/s (FIG. 20). Such ACA-TFI films (FIG. 18(c)) showed a strip pattern with alternating green and red colors under specular reflection illumination. The reflectance spectra of the film along the marked line was measured to characterize the colors in different regions. As plotted in the color map (FIG. 18(d)), the alternating colors were mixed colors typically resulting from two reflection peaks. The blue-shift of these two reflection peaks from near-infrared to red or from red to green color caused changes of the color along the marked line. Also, due to the continuous changes of the $2n_{ACA}d$ of the film, each point in the marked line rendered distinct dynamic color shifting features. In this way, ACA-TFI films with varying thicknesses are obtained by continuously increasing the coating speeds, which displayed numerous combined optical features. Of note is that when the film thickness is thin enough (d<1.15 µm), the color differences of the films could be distinguished by human eyes.

Figure 21:
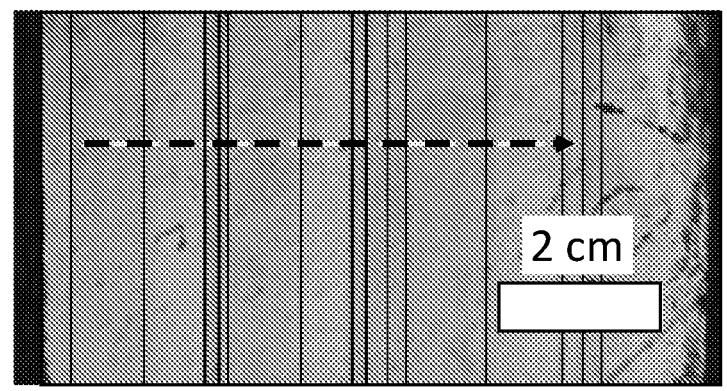
FIG. 21 shows a photo of a film having a thickness variation along the indicated arrow.
Figure 22:
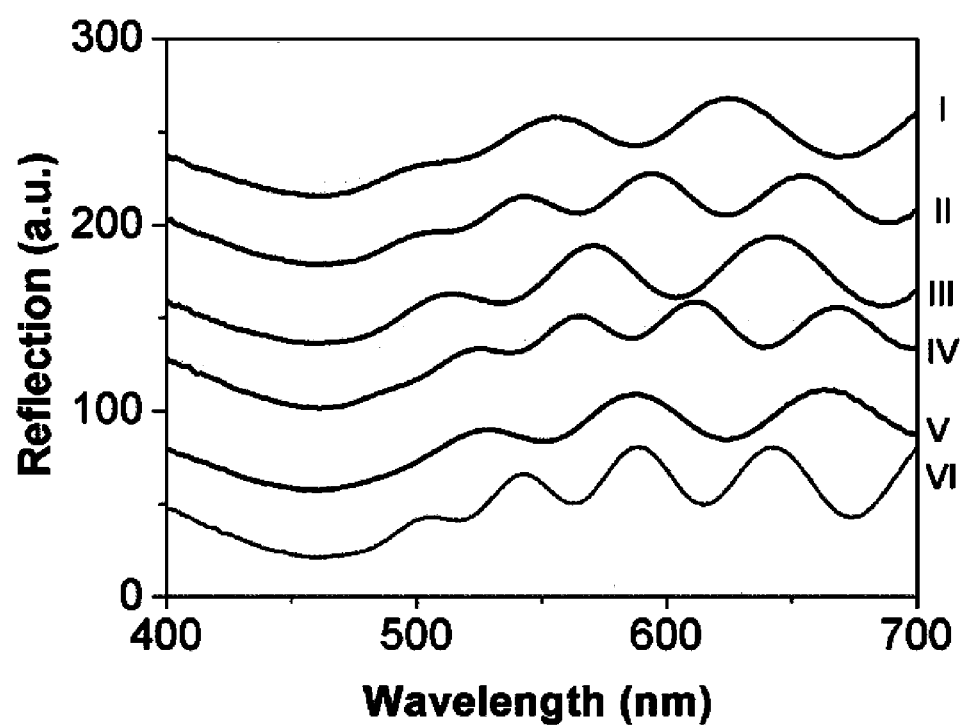
FIG. 22 shows reflection spectra of strips I to VI of FIG. 18.
Figure 23:
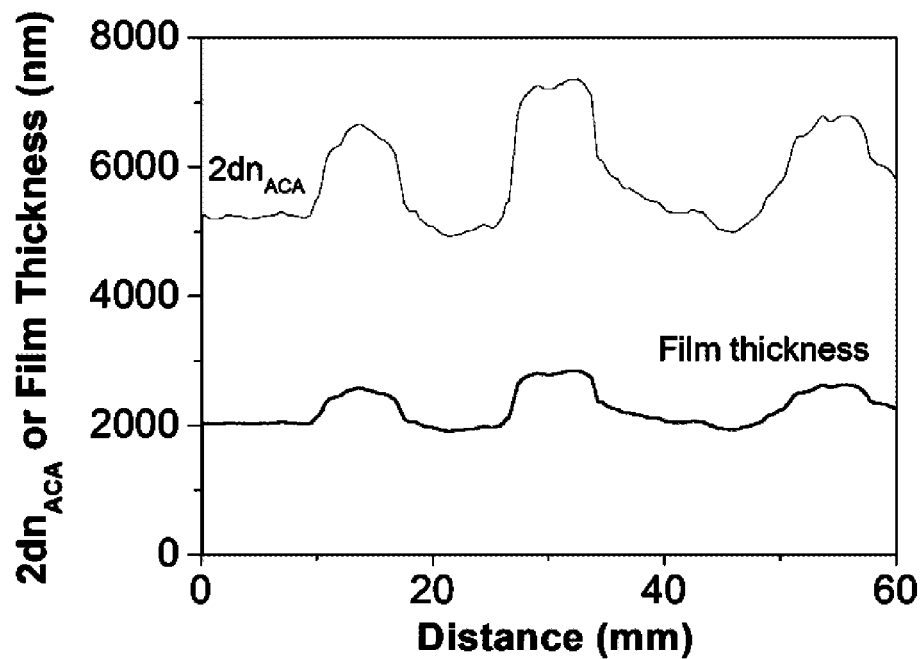
FIG. 23 shows the total optical path and thickness changes in the films as calculated according to the peak positions of the spectra of FIG. 22.

A stripe pattern (FIG. 18(e)) was fabricated by coating 8 wt % PS inks with Mayer rod #8 at continuously changing speeds, which displayed golden colors under specular lighting as shown in FIG. 21, wherein the vertical lines are added to schematically indicate the stripe pattern. The strips II, IV, VI of the stripe pattern were coated at a low speed of around 6 cm/s, while strips I, III, V were coated at a relatively high speed of around 9 cm/s. Compared to strips I, III, V, the strips II, IV, VI displayed brighter color under natural light due to stronger coherent scattering effects, indicating a larger optical path length ($2n_{ACA}d$), which is confirmed by the typical reflection spectra of the center points of each strip shown in FIG. 22. The reflection spectra of the marked line along the coating direction were measured and plotted in a color map (FIG. 18(f)). The presence of clear boundaries between neighboring strips indicated significant changes of film thicknesses, which was caused by acceleration or deceleration during coating. Two or three reflection peaks were typically observed for strips I-III-V or strips II-IV-VI respectively, indicating their difference in thicknesses. The total optical path and thickness changes in the films were calculated according to the peak positions and plotted in FIG. 23. It shows that the calculated average thickness of strips I-VI was 2.01, 2.47, 1.96, 2.77, 2.08, and 2.51 µm, respectively. Besides, clear blue-/red-shifts of yellow-red domains as a function of coating distance were observed in each strip of II-VI, which recorded the real-time speed changes of the Mayer rod during the coating process. Therefore, by controlling the coating processes, it is possible to design the optical properties of the ACA-TFI films in a continuous manner, which enables virtually infinite choice of optical coding in structural color patterns.

Example 5

Figure 24:
FIG. 24 shows an example of a product comprising an indicium comprising a thin film in accordance with various embodiments, for example a hierarchical disordered photonic superstructures (HDPS) anti-counterfeiting label with covert image.
Figure 24:
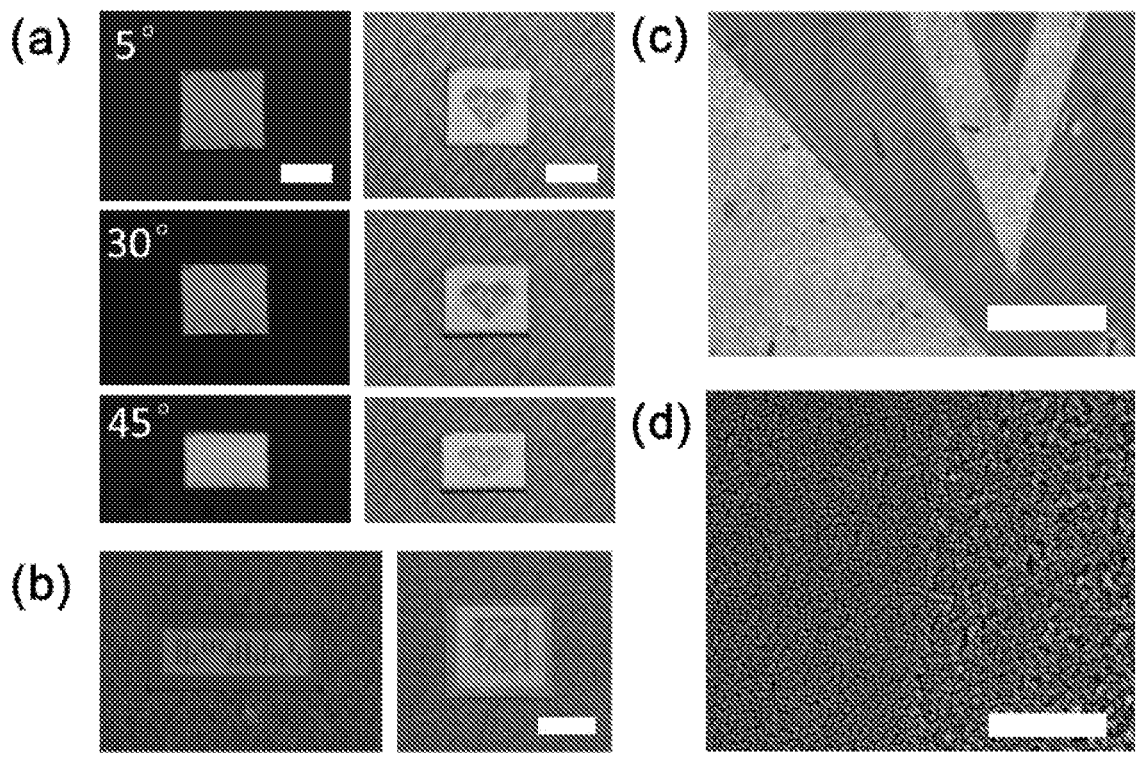

FIG. 24 shows an example of a product comprising an indicium comprising a thin film in accordance with various embodiments, for example, a HDPS anti-counterfeiting label with covert image. In FIG. 24(a), optical images of an anti-counterfeiting label captured under natural light and specular reflection illumination at different viewing angles are shown. The scale bar represents 0.5 cm. FIG. 24(b) shows 1D/2D-Pharmacode patterns. The scale bar represents 0.5 cm. FIG. 24(c) shows a microscopic image of the heart security pattern. The scale bar represents 100 µm. FIG. 24(d)

shows an SEM image of the boundary between treated and untreated regions of the heart label. The scale bar represents 5 μm.

Figure 25:
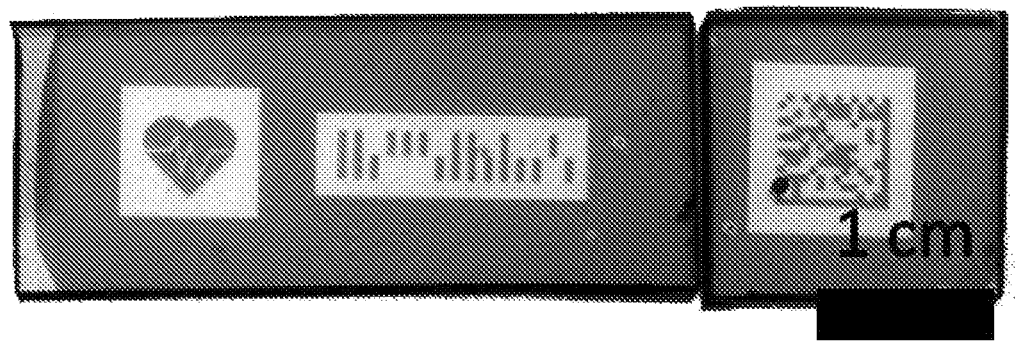
FIG. 25 shows examples of thin films prepared by patterning with PDMS stamps, in accordance with various embodiments.
Figure 26:
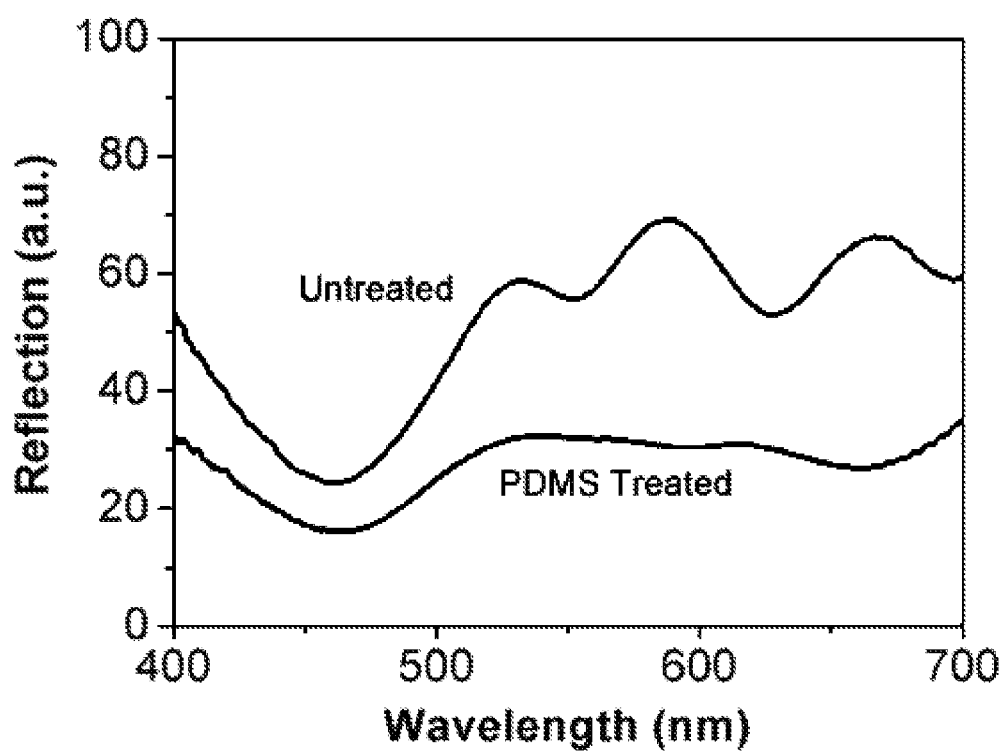
FIG. 26 shows that after PDMS treatment, the yellow colors caused by collective optical effects was significantly suppressed, and the brightness of green colors decreased as well.
Figure 27:
FIG. 27 shows a magnified detail of the microimprinted film, showing that high accuracy is easily obtained.
Figure 28:
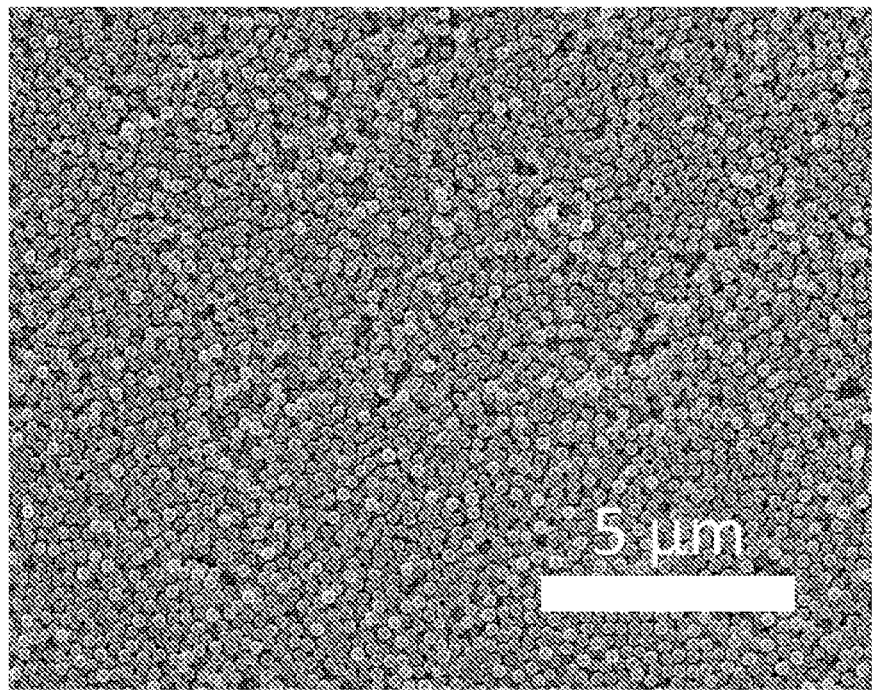
FIG. 28 shows a SEM image of a thin film, showing that a few particle clusters were removed from the films leading to cracks or caves in the films, which is responsible for the suppression of the TFI effect.

By using patterning, e.g., micro-imprinting methods, HDPS anti-counterfeiting labels that afford easy authentication methods by direct specular illumination may be produced. In examples, PDMS stamps with designed Gravure or Toppan micro-patterns (as shown in FIG. 25) were first prepared by replication of micro-fabricated silicon templates. A HDPS security label was prepared by imprinting the stamps on an ACA-TFI film with a $2n_{ACA}d$ of 4.69 μm and lifting them up afterward. As such, the HDPSs with encoded micro-patterns were obtained, as shown in FIG. 24(*a*). The color difference between the encoded and original regions in the label was hardly distinguishable by human eyes under natural light. However, under specular reflection illumination at varying viewing angles, such hidden pattern was easily revealed. 1D/2D-Pharmacode patterns coding the production date and location were also prepared, as displayed in FIG. 24(*b*). The high-magnification microscopy image (FIG. 24(*c*)) shows the color details of the heart security label. It was found that the ACA-TFI films were composed of yellow and green structural color domains. After PDMS treatment, the yellow colors caused by collective optical effects was significantly suppressed, and the brightness of green colors decreased as well, which was in line with the reflection spectra in FIG. 26. Due to the high accuracy offered by the micro-imprinting method, acute angles or lines with a width of around 80 μm or 40 μm (see FIG. 27) were easily obtained. The SEM image (FIG. 24(*d*)) of the boundary region indicates the high resolution of this micro-imprinting method. For the treated areas, most particles on the top most layer and a few particle clusters were removed from the films (also see FIG. 28), leading to cracks or caves in the films, which is responsible for the suppression of the TFI effect.

Example 6

Exemplary PDMS stamps used had an exemplary size of (2\*2\*0.5 or 5\*2\*0.5 cm$^3$), and were prepared by replicating a micro-fabricated silicon template. For example, 10 g PDMS (base) monomer and 1 g PDMS curing agent were mixed together and dropped onto the templates followed by heating at a temperature within the range of from 50 to 90° C. for 1 h. The PDMS stamps were placed onto the ACA-TFI films (e.g., $2n_{ACA}d>4$ μm) with a weight on them, e.g., of 200 g. After a sufficient time for providing contact, e.g., 30 seconds, the stamps were carefully peeled off from the ACA-TFI films to prepare the HDPS labels.

Example 7

Figure 29:
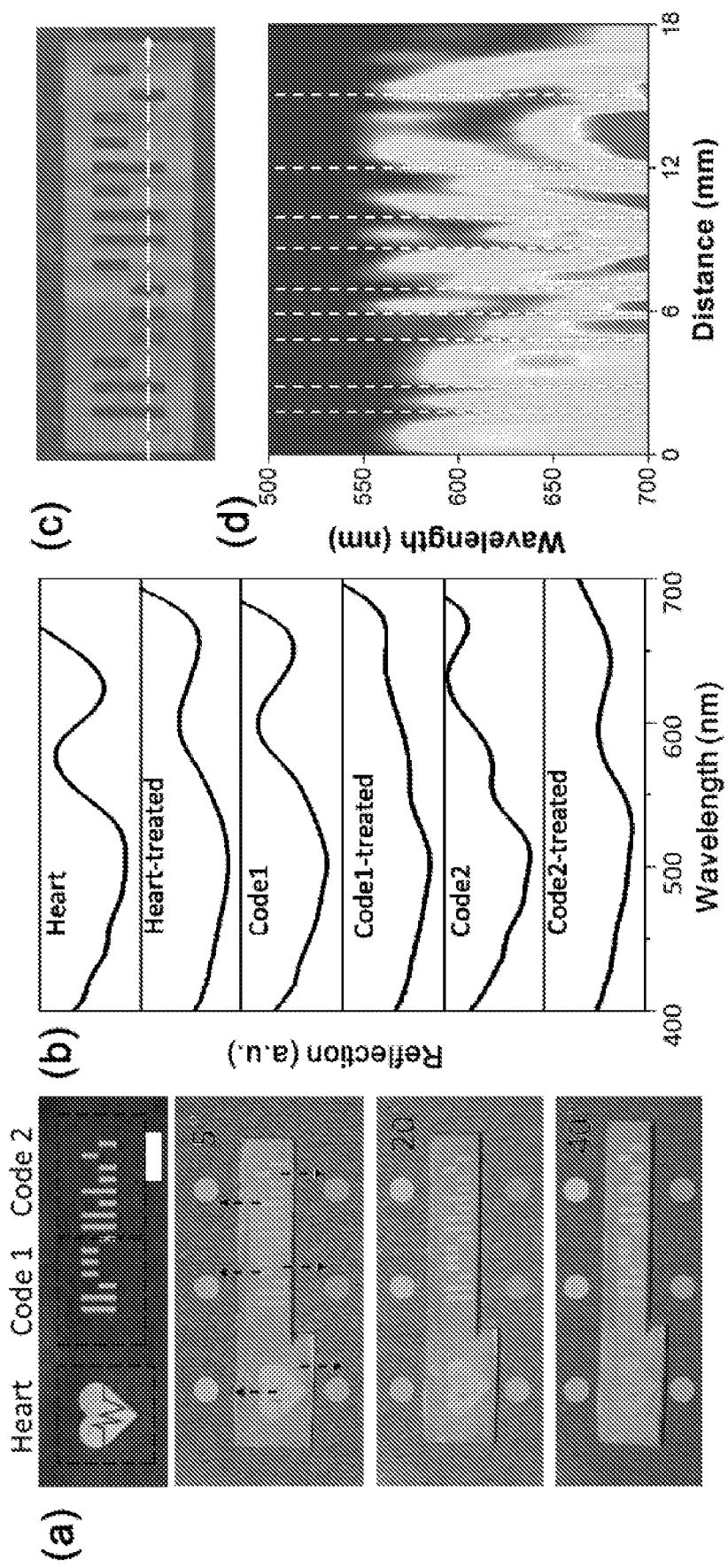
FIG. 29 shows an example of HDPS anti-counterfeiting labels with infinite optical coding, and their corresponding spectra and heatmap, in accordance with various embodiments.

An example of HDPS anti-counterfeiting labels with infinite optical coding is illustrated in connection with FIG. 29. FIG. 29(*a*) shows optical images of the PDMS-imprinted stamp and the multiple optical variable anti-counterfeiting HDPS label at different incident/viewing angles. FIG. 29(*b*) shows the reflectance of six different regions of the label. FIG. 29(*c*) shows the anti-counterfeiting HDPS label with alternatively increasing/decreasing thicknesses. FIG. 29(*d*) shows the color map of the reflection spectra of the film along the marked lines.

An anti-counterfeiting HDPS label that possessed multiple optical variable features (FIG. 29(*a*)) was produced by patterning, e.g., micro-imprinting, an ACA-TFI film with continuously decreasing thickness. Multiple optical variable anti-counterfeiting labels were created by PDMS micro-imprinting of ACA-TFI films with varied thicknesses prepared by coating 4 wt % 260 nm PS ink at changing coating speeds from 6 to 9 cm/s. The label includes three main coding regions, in which the heart, code-1, code-2 patterns were formed by PDMS treatment of their surrounding areas. The mirror reflectance of each region at an incident angle of 0° and 60° was measured for the calculation of the optical length ($2n_{ACA}d$), as plotted in FIG. 29(*b*). It was found that the reflection spectra of all six regions displayed two peaks in the visible light range at the viewing angle of 60°, which indicates that the colors in the PDMS-treated regions were also caused by the collective optical effects. The total optical paths ($2n_{ACA}d$) of heart, heart-treated, code-1 and code-2-treated regions were then calculated to be 3.65, 3.18, 3.18 and 2.97 μm respectively. The optical variable properties of the untreated code-1 and treated heart regions were almost the same due to their similar $2n_{ACA}d$. In addition, the calculated thickness of the heart-treated region decreased from 1.4 to 1.2 μm, which suggests that only one layer of particles on average was removed by PDMS treatment. Therefore, the optical paths or color-shifting properties of the films can be precisely tuned by micro-imprinting methods. Moreover, due to the difference in total optical paths, the six regions displayed distinct optical variable properties. When the viewing angle changed from 5° to 40°, the heart, code-1-treated, and code-2-treated regions displayed typical TFI-like color changes. For the heart region, its color changed from orange-red (5°) to green (20°) due to blue-shifting of the first reflection peak of 605 nm, and then changed back to red (40°) due to the blue-shifts of the second peak of 730 nm to the wavelength region of red color. Meanwhile, the heart-treated, code-1 and code-2 regions displayed iridescent-like color changes, because their calculated second peaks were in the near-infrared region (802, 802 and 873 nm).

Example 8

An anti-counterfeiting HDPS label was fabricated by micro-imprinting of an ACA-TFI film prepared by alternative acceleration and deceleration processes to provide high-level security features. As shown in FIG. 29(*c*), due to the continuous thickness changes and PDMS treatment, the label displayed multiple colored strips with varying widths along the marked line, and their reflectance was plotted in FIG. 29(*d*). The white dotted lines in the color map indicate the positions of imprinted rectangular strips in the security label, which showed darker red color and weaker reflectance. The color shifts from green, yellow to red (e.g. 6.6-7.8 mm, 14.2-17.7 mm) or inversed color changes (e.g. 9.9-11.5 mm, 11.7-14.2 mm) were recorded in the color map, where the generation of green or yellow colors was due to the existence of peaks in wavelength regions of 550-580 nm or 580-600 nm. Moreover, it is possible to easily alter the coating procedures, particle sizes, ink concentrations, or design distinct micro-imprinting patterns to create an unlimited number of security labels with distinct optical features, all of which make it extremely hard to forge and decipher, leading to highly encrypted anti-counterfeiting labels.

In the examples, characterization was done by using a SEM (JSM-6700F, Japan) to capture SEM images of nanostructures. A digital camera (EOS 700D, Canon) was used to capture all the optical images. An optical fiber UV-vis spectrometer (Ocean Optic HR2000CG) was used to record mirror-reflective or backscattering spectra. The reflectance of thin film interference was simulated by finite-element methods using periodic boundary condition (e.g., COMSOL Multiphysics 5.0), where the refractive index of the ACA-TFI films and the substrates below was set to be 1.3 and 1.6, respectively.

Here, hierarchical disordered photonic superstructures (HDPSs) with optical properties arising from tailored interplay of thin-film interference (TFI) and coherent scattering from amorphous colloidal arrays (ACAs) have been demonstrated. These HDPSs may be fabricated through the combined use of infiltration-driven colloidal assembly and micro-imprinting. On top of the optical properties of ACAs that are determined by the sizes or packing densities of their building blocks, TFI of the HDPSs is easily modulated by their film thicknesses, which can be tailored by changing coating speeds, particle concentrations or micro-imprinting. Uniformly thin ACA films with TFI effects may be coated on absorbing substrate, which display near-isotropic colors under natural light and mixed colors upon specular lighting due to the duplex optical effects. Micro-imprinting that can remove a patterned monolayer of particles from ACA-TFI films causes suppressed TFI in the imprinted regions, leading to HDPS films with encoded optical features. Collectively, HDPS anti-counterfeiting labels with covert and infinite optical coding may be achieved and their enhanced complexity results in sophisticated optical features that are virtually impossible to forge, allowing for high-level security applications.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A thin film comprising an amorphous array of particles, the thin film further comprising a top surface and a bottom surface opposing each other, the thin film exhibiting thin film interference and further coherent scattering from the amorphous array of particles, wherein the thin film comprises first regions and second regions, wherein the thin film interference of the second regions is suppressed as compared to the first regions.

2. The thin film of claim 1, wherein the particles of the amorphous array are particles having a size smaller than a thickness of the thin film.

3. The thin film of claim 2, wherein the thickness of the thin film at the first regions is in the range of 1 µm to 3 µm.

4. The thin film of claim 1, wherein a rugosity of the top surface in the second regions is higher than a rugosity of the top surface in the first regions.

5. The thin film of claim 1, wherein the top surface in the first regions is substantially flat, and wherein particles of a top layer of the amorphous array in the second regions are randomly spaced and at least partially spaced apart from neighboring particles of the top layer of the amorphous array in the second regions.

6. The thin film of claim 1, wherein the first regions are configured to scatter light by the amorphous array of particles and to exhibit the thin film interference.

7. The thin film of claim 1, wherein the second regions are configured to scatter light by the amorphous array of particles.

8. The thin film of claim 1, wherein the thin film is disposed on a substrate, wherein the substrate is configured to absorb a liquid, and wherein the particles of the amorphous array are dispersible in an ink composition comprising the liquid.

9. The thin film of claim 8, wherein the substrate is a porous substrate comprising pores sufficiently small to retain the particles of the amorphous array on a surface of the substrate.

10. The thin film of claim 1, wherein the amorphous array of particles is an amorphous colloidal array (ACA).

11. A product comprising an indicium comprising a thin film in accordance with claim 1, wherein the indicium comprises an encoded pattern encoded by the relative position of the second regions to the first regions, wherein the encoded pattern is visible under specular reflection of light of a pre-determined wavelength.

12. The product of claim 11,
wherein the pre-determined wavelength is in the non-visible light range; or
wherein the pre-determined wavelength is in the non-visible light range, and wherein the product is a packaging, a housing, a ticket, an access card, or an identification card.

13. A method of producing a thin film of claim 1, comprising:
providing an ink composition comprising ink particles and a liquid;
providing a substrate configured to absorb the liquid;
forming an optical thin film comprising depositing the ink composition on a surface of the substrate, wherein the liquid is separated from the ink particles by being drawn into the substrate, while the ink particles are retained on the surface of the substrate; and
modifying a top surface of the optical thin film, which is a surface facing away from the substrate, to at least partially suppress thin film interference.

14. The method of claim 13, wherein the ink particles are particles having a size smaller than a thickness of the thin film.

15. The method of claim 14, wherein the thickness of the thin film at first regions is in the range of 1 µm to 3 µm.

16. The method of claim 13, wherein depositing the ink composition comprises roll coating the ink composition on a surface of the substrate.

17. The method of claim 16, wherein the roll coating is carried out with a speed variation.

18. The method of claim 13, wherein modifying a top surface of the optical thin film comprises patterning the optical thin film into first regions which are unmodified and second regions, wherein the second regions comprise a rugosity that is higher than a rugosity of the first regions.

19. The method of claim 18, wherein patterning is carried out by stamp removal.

20. The method of claim 13, wherein the substrate is a porous substrate comprising pores sufficiently small to retain the ink particles on a surface of the substrate.

* * * * *